(12) United States Patent
Kim et al.

(10) Patent No.: US 11,062,423 B2
(45) Date of Patent: Jul. 13, 2021

(54) IMAGE DISPLAY APPARATUS AND METHOD OF OPERATING THE SAME

(71) Applicant: SAMSUNG ELECTRONICS CO., LTD., Suwon-si (KR)

(72) Inventors: Young-il Kim, Seongnam-si (KR); Jeong-rok Jang, Suwon-si (KR); Jung-rae Kim, Suwon-si (KR); Kil-soo Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/673,924

(22) Filed: Aug. 10, 2017

(65) Prior Publication Data
US 2018/0053280 A1    Feb. 22, 2018

(30) Foreign Application Priority Data

Aug. 16, 2016    (KR) .................. 10-2016-0103756

(51) Int. Cl.
| | |
|---|---|
| *G06T 3/20* | (2006.01) |
| *H04N 21/442* | (2011.01) |
| *H04N 21/218* | (2011.01) |
| *H04N 21/81* | (2011.01) |
| *H04N 21/433* | (2011.01) |

(Continued)

(52) U.S. Cl.
CPC .......... *G06T 3/20* (2013.01); *H04N 21/21805* (2013.01); *H04N 21/4334* (2013.01); *H04N 21/44222* (2013.01); *H04N 21/816* (2013.01); *H04N 5/23238* (2013.01); *H04N 5/23293* (2013.01); *H04N 21/4222* (2013.01); *H04N 21/42204* (2013.01)

(58) Field of Classification Search
CPC ............ G06T 3/20; H04N 2005/4425; H04N 21/42204; H04N 5/23238; H04N 5/4403
See application file for complete search history.

(56) References Cited

U.S. PATENT DOCUMENTS

| | | | |
|---|---|---|---|
| 8,200,352 B2 | 6/2012 | Park et al. | |
| 8,605,133 B2 | 12/2013 | Lampotang et al. | |

(Continued)

FOREIGN PATENT DOCUMENTS

| | | |
|---|---|---|
| CN | 101583010 A | 11/2009 |
| CN | 103676434 A | 3/2014 |

(Continued)

OTHER PUBLICATIONS

Search Report dated Nov. 17, 2017, issued by the International Searching Authority in counterpart International Patent Application No. PCT/KR2017/008722 (PCT/ISA/210).

(Continued)

*Primary Examiner* — Farzana Hossain
(74) *Attorney, Agent, or Firm* — Sughrue Mion, PLLC

(57) ABSTRACT

An image display apparatus includes a display, a memory configured to store instructions, and a processor configured to execute the instructions to obtain 360-degree content and angle of view information including a plurality of angle of view values selected to reproduce the 360 degree content, and control the display to display the 360-degree content according to the plurality of angle of view values included in the angle of view information.

11 Claims, 32 Drawing Sheets

(51) Int. Cl.
*H04N 5/232* (2006.01)
*H04N 21/422* (2011.01)

(56) References Cited

U.S. PATENT DOCUMENTS

| | | |
|---|---|---|
| 8,799,950 B2 | 8/2014 | Park et al. |
| 9,973,691 B2 | 5/2018 | Kato |
| 2004/0264919 A1 | 12/2004 | Taylor et al. |
| 2012/0092348 A1 | 4/2012 | McCutchen |
| 2013/0129304 A1* | 5/2013 | Feinson .................. H04N 5/77 386/223 |
| 2014/0192212 A1 | 7/2014 | He et al. |
| 2015/0082364 A1 | 3/2015 | Jayaram et al. |
| 2015/0249813 A1 | 9/2015 | Cole et al. |
| 2015/0254871 A1 | 9/2015 | MacMillan et al. |
| 2015/0373296 A1 | 12/2015 | Ushiyama |
| 2016/0080650 A1* | 3/2016 | Okazawa ........... H04N 5/23238 348/36 |
| 2016/0080830 A1 | 3/2016 | Kim et al. |
| 2016/0234556 A1* | 8/2016 | Berridge ............ H04N 21/4758 |
| 2016/0320692 A1 | 11/2016 | Takahashi et al. |
| 2017/0118540 A1* | 4/2017 | Thomas ........... H04N 21/85406 |
| 2018/0061118 A1* | 3/2018 | Choi .................... H04N 13/366 |
| 2018/0115806 A1 | 4/2018 | Hwang et al. |
| 2018/0122130 A1* | 5/2018 | Kim ...................... G06T 19/20 |
| 2018/0332163 A1* | 11/2018 | Park ................. H04M 1/72522 |

FOREIGN PATENT DOCUMENTS

| | | |
|---|---|---|
| CN | 103703755 A | 4/2014 |
| CN | 104199944 A | 12/2014 |
| JP | 2014-165839 A | 9/2014 |
| JP | 2015-15583 A | 1/2015 |
| JP | 2015-187797 A | 10/2015 |
| KR | 10-0827129 B1 | 5/2008 |
| KR | 10-1397433 B1 | 6/2014 |
| KR | 10-1518814 B1 | 5/2015 |
| WO | 2015/126144 A1 | 8/2015 |

OTHER PUBLICATIONS

Written Opinion dated Nov. 17, 2017, issued by the International Searching Authority in counterpart International Patent Application No. PCT/KR2017/008722 (PCT/ISA/237).
Communication dated Nov. 6, 2018, issued by the European Patent Office in counterpart European Application No. 17841645.9.
Communication dated Aug. 20, 2019 issued by the State Intellectual Property Office of P.R. China in counterpart Chinese Application No. 201710702848.2.
Communication dated Jan. 28, 2020, issued by the Japanese Patent Office in counterpart Japanese Application No. 2019-506662.
Communication dated Apr. 16, 2020, issued by the State Intellectual Property Office of P.R. China in counterpart Chinese Application No. 201710702848.2.
Notice of Allowance dated Jul. 14, 2020 issued by the Japanese Patent Office in Japanese Application No. 2019-506662.

* cited by examiner

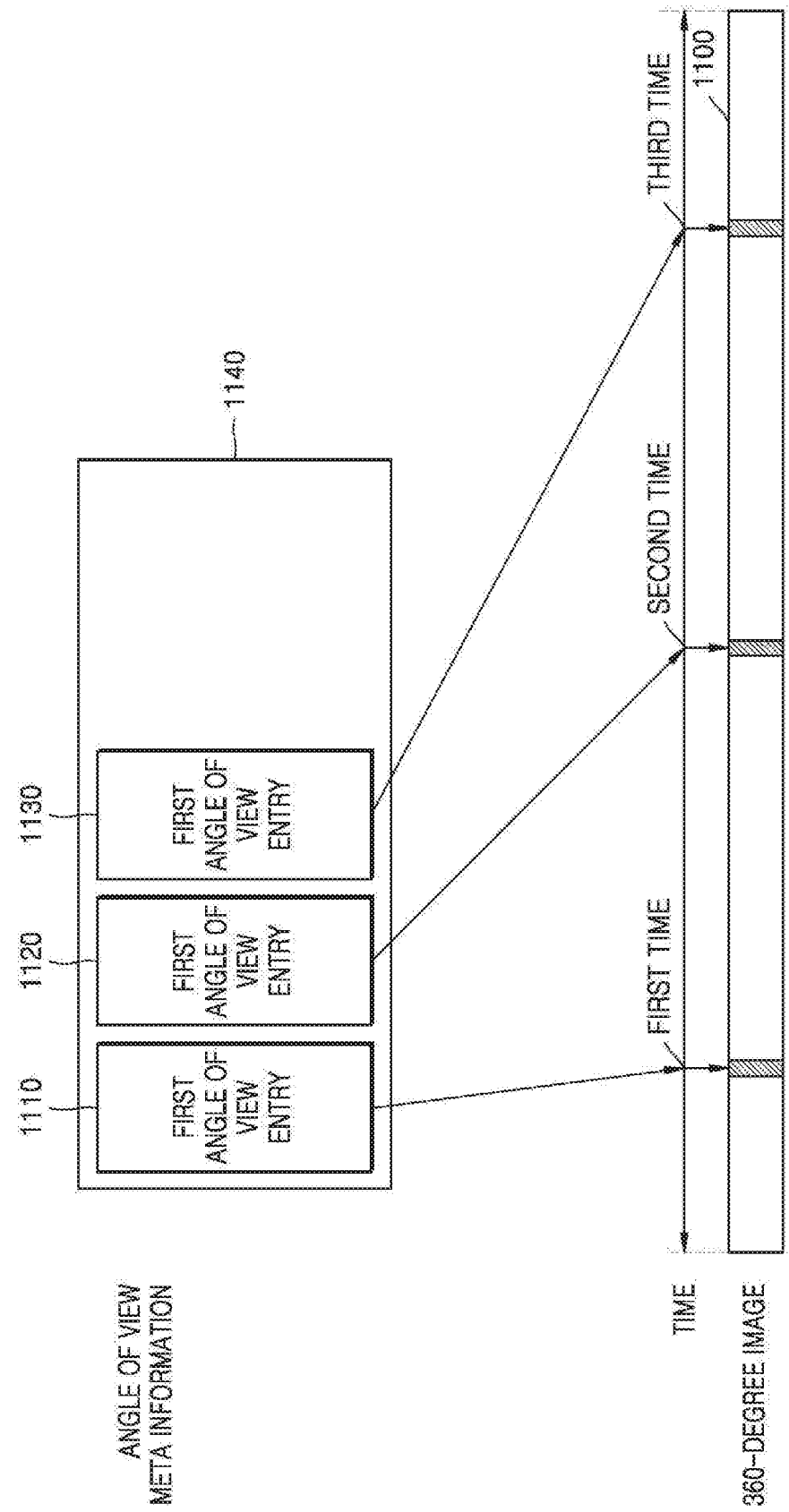

IMAGE DISPLAY APPARATUS AND METHOD OF OPERATING THE SAME

CROSS-REFERENCE TO RELATED APPLICATION

This application claims priority from Korean Patent Application No. 10-2016-0103756, filed on Aug. 16, 2016 in the Korean Intellectual Property Office, the disclosure of which is incorporated herein by reference in its entirety.

BACKGROUND

1. Field

Apparatuses and methods consistent with example embodiments relate to image display apparatuses and methods of operating the same, and more particularly, to an image display apparatus capable of displaying a 360-degree image and a method of operating the image display apparatus.

2. Description of the Related Art

Image display apparatuses are capable of displaying images that are viewable by users. For example, users can view a broadcast via an image display apparatus. Image display apparatuses display, on a display included therein, a broadcast which a user selects from among signals broadcast by a broadcasting station. Currently, most countries around the world have switched from analog broadcasting to digital broadcasting.

In digital broadcasting, a digital image signal and a digital audio signal are transmitted. When compared to analog broadcasting, digital broadcasting is resilient against external noise, thus having little data loss, has more favorable error correction, and provides high-resolution and high-definition screen images. In addition, digital broadcasting can provide a bidirectional service, which analog broadcasting cannot.

Smart televisions (TVs) capable of providing various types of content in addition to a digital broadcasting function have recently been developed. Smart TVs aim to analyze and provide content desired by a user without requiring manual operation by the user.

SUMMARY

Example embodiments may address at least the above problems and/or disadvantages and other disadvantages not described above. Also, the example embodiments are not required to overcome the disadvantages described above, and may not overcome any of the problems described above.

Example embodiments provide an image display apparatus capable of effectively managing angle of view information that is used in reproduction of a 360-degree image, and a method of operating the image display apparatus.

Additional aspects will be set forth in part in the description which follows and, in part, will be apparent from the description, or may be learned by practice of the example embodiments.

According to an aspect of an example embodiment, there is provided an image display apparatus including: a display; a memory configured to store instructions; and a processor configured to execute the instructions to: obtain 360-degree content and angle of view information corresponding to an angle of view; and control the display to display the 360-degree content according to the angle of view information, wherein the angle of view information includes a plurality of entries corresponding to a plurality of selected angle of view values for reproducing the 360-degree content, and wherein each entry of the plurality of entries specifies the angle of view value indicating a region of the 360-degree content to be displayed, and each entry includes information indicating a time point at which the angle of view is applied or a frame for which the angle of view value is applied.

Each entry of the plurality of entries may further include zoom size information.

The image display apparatus may further include a communication interface, and the processor may be further configured to execute the instructions to control the communication interface to receive the angle of view information from an external computer.

The angle of view information may be recommended according to a preset criterion from among a plurality of pieces of angle of view information corresponding to the 360-degree content.

The processor may be further configured to execute the instructions to extract the angle of view information from the 360-degree content or obtain the angle of view information from a meta file separate from the 360-degree content.

According to an aspect of another example embodiment, there is provided an image display apparatus including: a display; a memory configured to store instructions; and a processor configured to execute the instructions to: receive a user input during a reproduction of 360-degree content; and create angle of view information based on the user input, wherein the user input includes inputting a plurality of selected angle of view values for reproducing the 360-degree content, wherein the angle of view information includes a plurality of entries, and wherein each entry of the plurality of entries specifies the angle of view value indicating a region of the 360-degree content to be displayed, and each entry includes information indicating a time point at which the angle of view is applied or a frame in which the angle of view value is applied.

Each entry of the plurality of entries may further include zoom size information.

The processor may be further configured to execute the instructions to store the angle of view information in a file of the 360-degree content, or store the angle of view information in a meta file separate from the file of the 360-degree content.

The angle of view information may correspond to an object included in the 360-degree content, and the angle of view information may further include information for identifying the object.

The processor may be further configured to execute the instructions to: receive a user input corresponding to at least one angle of view value selected for reproducing a 360-degree image corresponding to at least one file from among a plurality of files that constitute the 360-degree content, wherein the angle of view information may further include: the at least one angle of view value selected for reproducing the 360-degree image, and a file identifier corresponding to each of the at least one angle of view value.

According to an aspect of another example embodiment, there is provided a method of operating an image display apparatus, the method including: obtaining 360-degree content and angle of view information; and displaying the 360-degree content according to the angle of view information, wherein the angle of view information includes a plurality of entries corresponding to a plurality of selected angle of view values for reproducing the 360 degree content, and wherein each entry of the plurality of entries specifies the angle of view value representing a region of the 360-degree content to be displayed, and each entry includes information indicating a time point at which the angle of view is applied or a frame for which the angle of view value is applied.

Each entry of the plurality of entries may further include zoom size information.

The method may include receiving the angle of view information from an external computer.

The angle of view information may be recommended according to a preset criterion from among a plurality of pieces of angle of view information corresponding to the 360-degree content.

The method may include extracting the angle of view information from a file of the 360-degree content or obtaining the angle of view information from a meta file separate from the file of the 360-degree content.

According to an aspect of another example embodiment, there is provided a method of operating an image display apparatus, the method including: receiving a user input during a reproduction of 360-degree content; and creating angle of view information based on the user input, wherein the user input includes a plurality of selected angle of view values for reproducing the 360-degree content, wherein the angle of view information includes a plurality of entries, and wherein each entry of the plurality of entries specifies the angle of view value indicating a region of the 360-degree content to be displayed, and each entry includes information indicating a time point at which the angle of view is applied or a frame in which the angle of view value is applied.

Each entry of the plurality of entries may further include zoom size information.

The method may include storing the angle of view information in a file of the 360-degree content, or storing the angle of view information in a meta file separate from the file of the 360-degree content.

The angle of view information may correspond to an object included in the 360-degree content, and the angle of view information may further include information for identifying the object.

According to an aspect of another example embodiment, a non-transitory computer-readable recording medium has recorded thereon a computer program, which, when executed by a computer, performs the method of operating the image display apparatus.

According to an aspect of another example embodiment, there is provided an image display apparatus including: a memory configured to store one or more instructions; and a processor configured to execute the instructions stored in the memory to: obtain 360-degree content and angle of view information corresponding to an angle of view, wherein the 360-degree content includes a plurality of objects; receive a user input for selecting at least one object from among the plurality of objects in the 360-degree content; and display a location of the selected at least one object by reproducing the 360-degree content by using the angle of view information that is created by tracking the selected at least one object.

The tracking the selected at least one object may include displaying an indicator to identify the selected at least one object.

The indicator may include at least one from among a spherical indicator and a cylindrical indicator.

The selected at least one object may be a person depicted in the 360-degree content.

BRIEF DESCRIPTION OF THE DRAWINGS

The above and/or other aspects will become apparent and more readily appreciated from the following description of the example embodiments, taken in conjunction with the accompanying drawings in which:

FIG. 12 is a reference diagram illustrating a method of reproducing a 360-degree image by using angle of view meta information generated based on the 360-degree image, according to an example embodiment;

DETAILED DESCRIPTION

Figure 1:
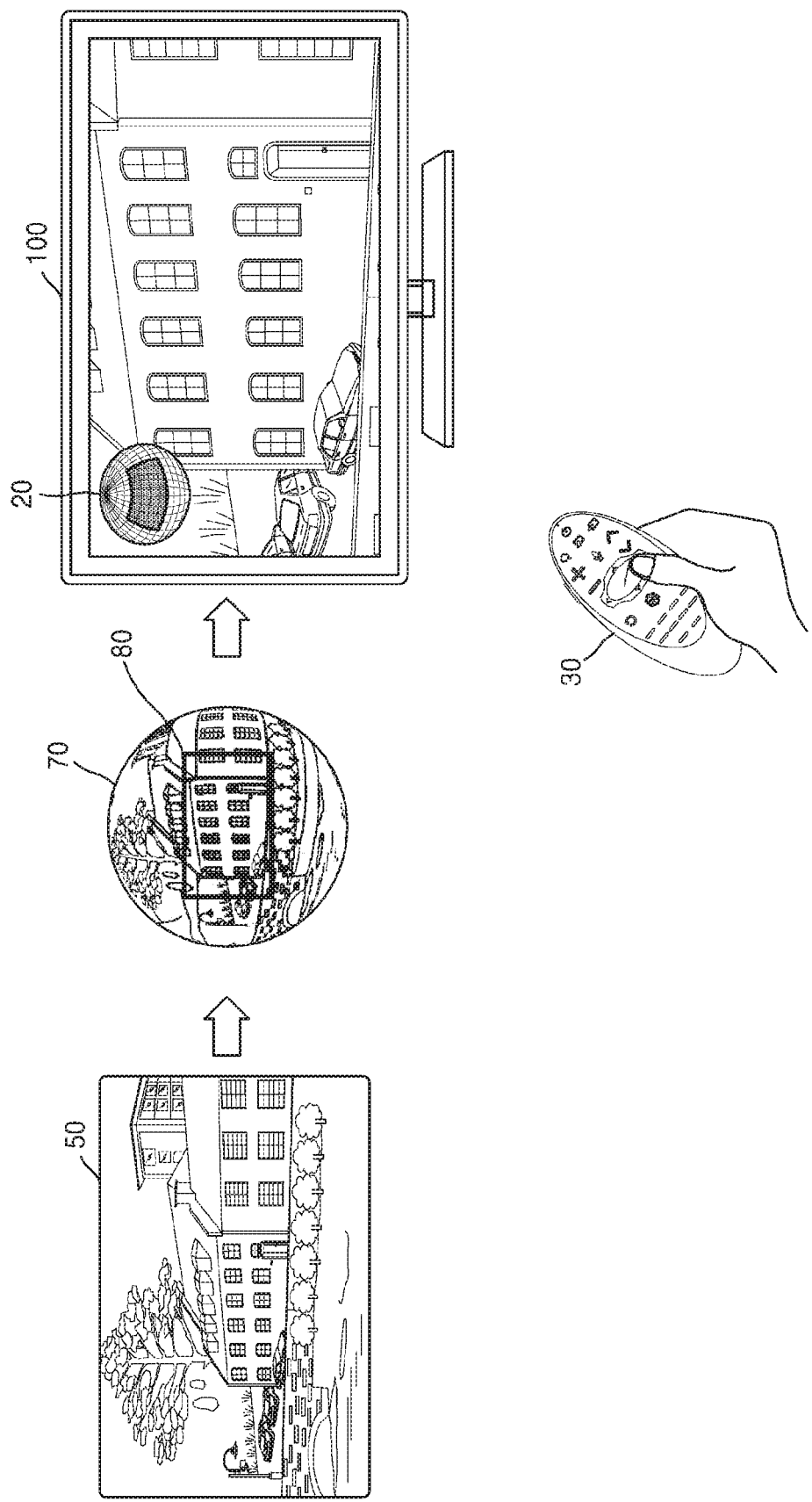
FIG. 1 is a diagram illustrating an image display apparatus that displays a 360-degree image, and a control apparatus, according to an example embodiment.

Hereinafter, the terms used in the specification will be briefly described, and then example embodiments will be described in detail.

Although general terms widely used at present were selected for describing example embodiments in consideration of the functions thereof, these general terms may vary according to intentions of one of ordinary skill in the art, case precedents, the advent of new technologies, and the like.

The terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a unit in which at least one function or In operation is performed, and may be implemented as hardware, software, or a combination of hardware and software.

Example embodiments are described in detail herein with reference to the accompanying drawings so that this disclosure may be easily performed by one of ordinary skill in the art to which the present disclosure pertains. Example embodiments may, however, be embodied in many different forms and should not be construed as being limited to the example embodiments set forth herein. In the drawings, parts irrelevant to the description may be omitted for simplicity of explanation, and like numbers refer to like elements throughout.

The term "user" used herein denotes a person who controls a function or operation of an image display apparatus by using a control apparatus. Examples of the user may include a viewer, a manager, or an installation engineer.

FIG. 1 is a diagram illustrating an image display apparatus 100 that displays a 360-degree image, and a control apparatus 30, according to an example embodiment.

Referring to FIG. 1, the image display apparatus 100 may display a 360-degree image. The 360-degree image according to an example embodiment may be an image having an angle of view of 360 degrees. The 360-degree image may be a still image, a moving picture, or a panorama image. For example, the 360-degree image may be an image generated based on a plurality of images captured in a direction of 360 degrees by using at least one camera. In this regard, the captured plurality of images may be mapped to a sphere, and contact points of the mapped images may be stitched; thus, a spherical 360-degree image may be generated. Also, the spherical 360-degree image may be converted into a planar 360-degree image 50 so as to be transmitted to or stored in another device as illustrated in FIG. 1.

The image display apparatus 100 according to an example embodiment may convert the planar 360-degree image 50 into a spherical 360-degree image 70 by performing graphics processing on the planar 360-degree image 50. The image display apparatus 100 may select a region 80 corresponding to a certain angle of view from the spherical 360-degree image 70 and display an image corresponding to the selected region 80 on a display. In this regard, the image display apparatus 100 may scale the image corresponding to the selected region 80 according to a resolution of the display and display the scaled image on the display. The image display apparatus 100 according to an example embodiment may display a three-dimensional (3D) indicator 20 indicating a location of the region 80 within the 360-degree image 70. The angle of view of the 360-degree image will be described later in detail with reference to FIG. 2.

The image display apparatus 100 according to an example embodiment may be a TV, but this is merely an example embodiment. The image display apparatus 100 may be implemented as an electronic device including a display. For example, the image display apparatus 100 may be any type of electronic device, such as a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device. In particular, example embodiments of the image display apparatus 100 may be easily implemented in a display apparatus having a large display, such as a TV. However, example embodiments are not limited thereto. The image display apparatus 100 may be fixed or movable, or a digital broadcast receiver.

The image display apparatus 100 may be implemented as a flat display apparatus, a curved display apparatus having a curvature, or a flexible display apparatus with an adjustable curvature. An output resolution of the image display apparatus 100 may be, for example, a high definition (HD), a full HD, an ultra HD, or a resolution that is higher and clearer than an ultra HD.

The image display apparatus 100 may be controlled by the control apparatus 30. The control apparatus 30 may be implemented as any of various types of devices for controlling the image display apparatus 100, such as a remote controller or a mobile phone.

The control apparatus 30 may control the display apparatus 100 via short-range communication such as infrared or Bluetooth, but is not limited to these. The control apparatus 30 may control a function of the image display apparatus 100 by using at least one selected from keys (e.g., buttons) included in the control apparatus 30, a touch pad, a microphone capable of receiving voices of users, and a sensor capable of recognizing motions of the control apparatus 30.

For example, the control apparatus 30 may include 4 directional keys (or 4 direction buttons). The 4 directional keys may be used to move the location of the region 80 displayed on the display within the 360-degree image 70.

The control apparatus 30 may be a pointing device. For example, when the control apparatus 30 receives a certain key input, the control apparatus 30 may operate as a pointing device. When the control apparatus 30 operates as a pointing device, the image display apparatus 100 may be controlled by a user input for moving the control apparatus 30 upward, downward, leftward, or rightward, or tilting the control apparatus 30 in any random direction. Information about a motion of the control apparatus 30 that is sensed via the sensor of the control apparatus 30 may be transmitted to the image display apparatus 100. The image display apparatus 100 may move the region 80 displayed on the display within the 360-degree image 70, based on the motion information of the control apparatus 30.

When the control apparatus 30 includes a touchpad, the image display apparatus 100 may move, according to a displacement value of a subject moving on the touchpad (e.g., a user's finger), the region 80 displayed on the display within the 360-degree image 70.

Figure 2:
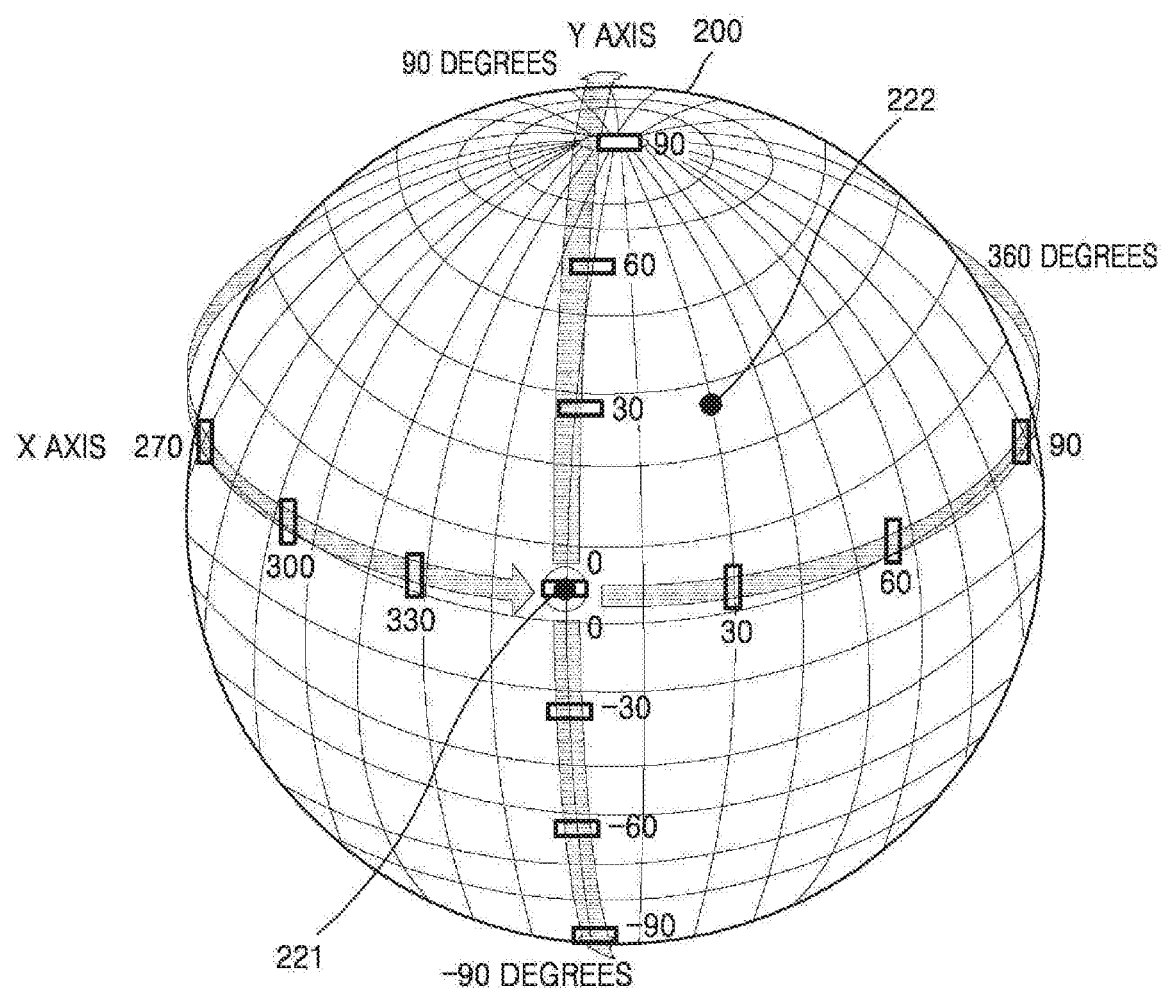
FIG. 2 is a diagram illustrating an angle of view of a 360-degree image, according to an example embodiment.

FIG. 2 is a diagram illustrating an angle of view of a 360-degree image.

As described above, the 360-degree image may be generated based on a plurality of images captured in 360 degrees by using at least one camera. In this regard, the captured plurality of images may be mapped to a sphere, and contact points of the mapped images may be stitched, and thus a spherical 360-degree image may be generated.

The 360-degree image may refer to an image having an angle of view of 360 degrees. When a 360-degree image is expressed as an image 200 having a spherical shape, the angle of view of the 360-degree image may be expressed with respect to an x-axis and a y-axis. x-axis coordinates may be used to express an angle formed when a vertical plane passing through the center of the sphere rotates along a surface of the sphere. y-axis coordinates may be used to express an angle formed when a horizontal plane passing through the center of the sphere rotates along the surface of the sphere. For example, the x-axis coordinates may be in a range of 0 degrees to 360 degrees. For example, the y-axis coordinates may be in a range of −90 degrees to 90 degrees or 0 degrees to 180 degrees.

For example, referring to FIG. 2, when the angle of view (x degrees, y degrees) at a reference point 221 in the sphere-shaped image 200 is (0 degrees, 0 degrees), the angle of view at a point 222 is (30 degrees, 30 degrees).

Figure 3A:
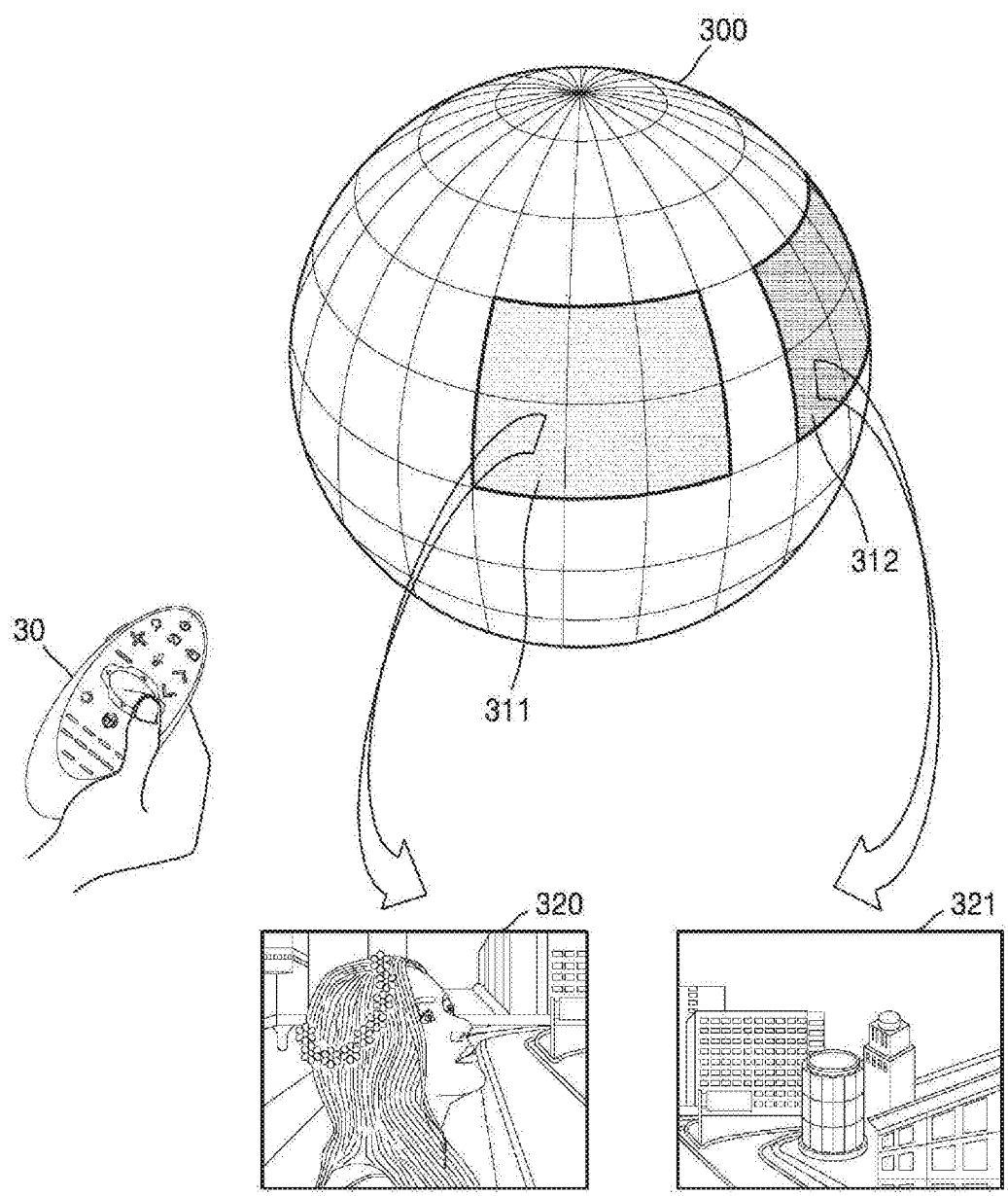
FIG. 3A is a diagram for illustrating a method of displaying a 360-degree image, according to an example embodiment.

FIG. 3A is a diagram illustrating a method of displaying a 360-degree image, according to an example embodiment.

The user may navigate a 360-degree image to view an image 300 in accordance with a desired angle of view. For example, referring to FIG. 3A, when the user viewing an image 320 of a region 311 at an angle of view of 0 degrees wants to view a region located to the right of region 311 (e.g., an adjacent region on the right side of region 311), the user may provide an input via the control apparatus 30 to adjust the angle of view. For example, when the user provides an input adjusting the angle of view by 60 degrees, the image display apparatus 100 may display an image 321 which corresponds to a region 312 viewed at an angle of view of 60 degrees.

According to an example embodiment, the user may move the angle of view of the 360-degree image by using the four directional keys of the control apparatus 30. For example, the user may horizontally move the 360-degree image by using left and right direction keys among the four directional keys. For example, the user may vertically move the 360-degree image by using up and down direction keys among the four directional keys.

According to an example embodiment, the user may adjust the angle of view of the 360-degree image by moving the control apparatus 30 including an acceleration sensor or a gyroscope in a vertical direction, a horizontal direction, or in an arbitrary direction.

According to an example embodiment, the user may adjust the angle of view of the 360-degree image in a direction of touching and moving his or her finger on a touch pad included in the control apparatus 30.

According to an example embodiment, when the image display apparatus 100 includes a touch-sensitive screen, the user may adjust the angle of view of the 360-degree image by using a touch movement of his or her finger on the touch-sensitive screen of the image display apparatus 100.

According to an example embodiment, the user may zoom in or out the 360-degree image by using a specific key or button of the control apparatus 30 or via a gesture made by using the control apparatus 30. In response to a zoom-in input, the image display apparatus 100 may magnify and display a currently-being-displayed region. In response to a zoom-out input, the image display apparatus 100 may shrink and display the currently-being-displayed region. For example, when a zoom-out degree exceeds a preset threshold, the image display apparatus 100 may display an image in a spherical shape. For example, zooming may have a range of −4 times to 4 times.

Figure 3B:
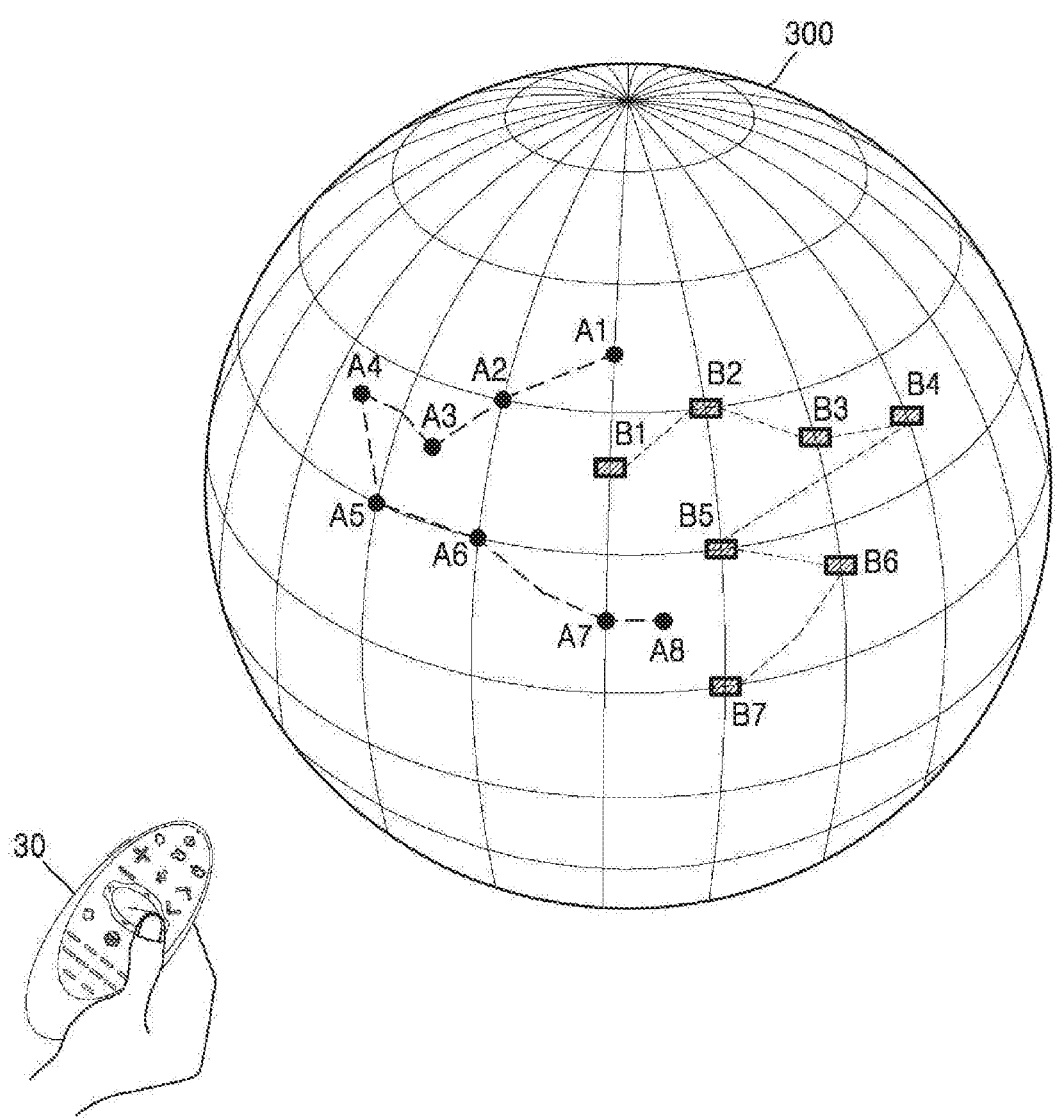
FIG. 3B is a reference diagram illustrating a plurality of pieces of angle of view information corresponding to a 360-degree image, according to an example embodiment.

FIG. 3B is a reference diagram illustrating a plurality of pieces of angle of view information corresponding to a 360-degree image 300.

Because the 360-degree image includes images captured in all directions (i.e., 360 degree view) at a single time point, the 360-degree image includes a much higher amount of information than an image captured in a single direction. In other words, at a specific time point, an image viewed by a user at an angle of view of 0 degrees may be totally different from an image viewed by the user at an angle of view of 90 degrees or 180 degrees. As such, the 360-degree image includes a large amount of data or information (e.g., multiple regions, each corresponding to an angle of view), and the user may select a region to view by specifying angles of view. For example, when a music video including several singers (e.g., singer A, singer B, etc.) is provided as a 360-degree image, a user may want to watch the 360-degree image according to an angle of view focused on a singer A. Thus, while watching the 360-degree image, the user may adjust the angle of view to obtain an angle of view focused on the singer A. Another user may adjust the angle of view to obtain an angle of view focused on singer B.

Referring to FIG. 3B, the user may adjust the angle of view to A1 when watching a 360-degree music video, and thus, may watch the 360-degree image at the angle of view A1. Then, the user may adjust the angle of view to A2 after a predetermined time point has lapsed and may watch the 360-degree image at the angle of view A2. Angles of view selected by the user from a start of the 360-degree image to an end thereof may be represented as A1-A2-A3-A4-A5-A6-A7-A8. When the user watches the same 360-degree music video next time, the user may watch a portion of the 360-degree music video corresponding to an angle of view of B1 and adjust the angle of view to B2 after a predetermined time point has lapsed. As a result, angles of view selected by the user from the start of the 360-degree image to the end thereof may be represented as B1-B2-B3-B4-B5-B6-B7. As such, even in the case of a single 360-degree image, different images may be shown according to angles of view selected by the user, and, because a numerous number of angles of view may be selected within the 360-degree image, a numerous number of images may be provided according to the angles of view, based on the 360-degree image.

The user may want to rewatch the 360-degree music video according to angle of view information corresponding to a previous viewing session, for example, according to angles of view A1-A2-A3-A4-A5-A6-A7-A8. Thus, according to example embodiments disclosed herein, angles of view selected by a user are stored as angle of view information and managed, as described above. When the angle of view information is managed as such, the user may select (e.g., via the control apparatus 30, via a speech input, etc.) the stored angle of view information and conveniently watch the 360-degree image according to the angles of view stored therein, without having to adjust the angles of view again when rewatching the 360-degree music video.

In addition, because the angle of view information is separately managed, the user may edit previously created angle of view information (e.g., angle of view information previously set or stored by a user, angle of view information previously set by a broadcast station, etc.).

The previously-created angle of view information may be used not only for an initially targeted 360-degree image but also for another 360-degree image. For example, when angle of view information for tracking a center singer within a 360-degree music video 1 of a singer group including 5 singers is created, the created angle of view information may be used in another music video of the singer group, namely, a 360-degree music video 2. In other words, the angle of view information for tracking the center singer may be used in all other 360-degree music videos.

The user may transmit or distribute angle of view information to another user or onto another network. Similarly, the user may obtain angle of view information already created by other users or via other networks.

A service provider that provides 360-degree content may create angle of view information associated with the 360-degree content and provide the created 360-degree content to a user, together with or separate from the 360-degree content. Accordingly, in addition to searching for the 360-degree content, users may search the angle of view information associated with the 360-degree content to find desired angle of view information.

As described above, because a 360-degree image includes enormous amounts of information, angle of view information according to example embodiments is independently managed, and thus, the enormous amounts of information of the 360-degree image may be systematically and effectively managed.

Figure 4:
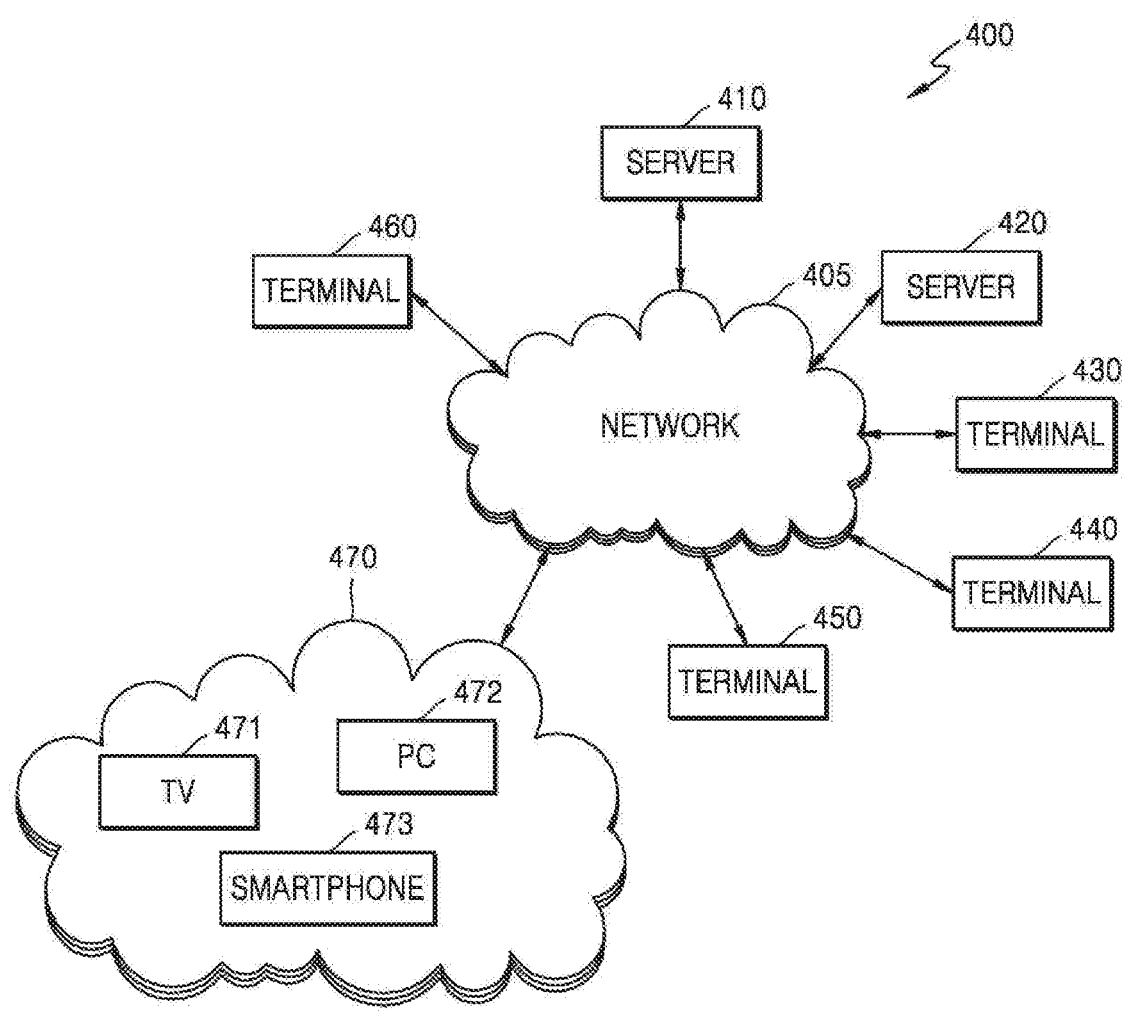
FIG. 4 is a schematic view illustrating a system including a plurality of servers and a plurality of terminals to manage angle of view information of a 360-degree image, according to an example embodiment.

FIG. 4 is a schematic view illustrating a system 400 including a plurality of servers and a plurality of terminals to manage angle of view information of a 360-degree image, according to an example embodiment.

Referring to FIG. 4, the system 400 may include servers 410 and 420, terminals 430, 440, 450, and 460, a terminal group 470, and a network 405.

The servers 410 and 420, the terminals 430, 440, 450, and 460, and the terminal group 470 may be connected to each other via the network 405.

The terminals 430, 440, 450, and 460 and the terminal group 470 may include any electronic device or computing device that includes a processor and a display and is able to display a 360-degree image.

According to an example embodiment, the terminals 430, 440, 450, and 460 and the terminal group 470 may display a 360-degree image, and may create angle of view information including at least one angle of view value according to a user input of adjusting an angle of view of the 360-degree image. A terminal may store angle of view information created for a 360-degree image, and may reproduce the 360-degree image later by using the created angle of view information. Thus, by selecting a desired moving direction of a 360-degree image while viewing the 360-degree image, and creating and storing angle of view information for tracking the selected moving direction, a user may reproduce the 360-degree image by using the already-created angle of view information without needing to newly adjust the angle of view when viewing the 360-degree image again later, thereby conveniently watching a 360-degree image in a desired direction.

According to an example embodiment, the terminals 430, 440, 450, and 460 and the terminal group 470 may easily correct or edit the created angle of view information.

The terminal group 470 may include a TV 471, a personal computer (PC) 472, and a smartphone 473. For example, a user may create and store angle of view information corresponding to the 360-degree image by using the PC 472. When the user reproduces the 360-degree image via the TV 471 or the smartphone 473, the user may read out the created angle of view information and may reproduce the 360-degree image by using the angle of view information corresponding to the 360-degree image.

According to an example embodiment, the terminals 430, 440, 450, and 460 and the terminal group 470 may transmit the created angle of view information to other terminals or the servers 410 and 420 via the network 405.

According to an example embodiment, the terminals 430, 440, 450, and 460 and the terminal group 470 may receive the already-created angle of view information from the server 410 or 420 and may reproduce the 360-degree image by using the received angle of view information.

According to an example embodiment, the servers 410 and 420 may collect angle of view information corresponding to a 360-degree image from at least one terminal. The servers 410 and 420 may manage or rank collected pieces of angle of view information according to a certain criterion. For example, a server may collect and manage at least one piece of angle of view information created for a specific 360-degree music video, and, when there is a request from a terminal, the server may transmit requested angle of view information to the terminal. The server may be a server of a service provider that provides a 360-degree image. The server may provide angle of view information together with or independently from the 360-degree image.

As such, the angle of view information management system 400 of FIG. 4 may independently create, manage, and distribute angle of view information for 360-degree image content for which a demand increases in the future, thereby satisfying various needs of users that consume 360-degree content.

Figure 5:
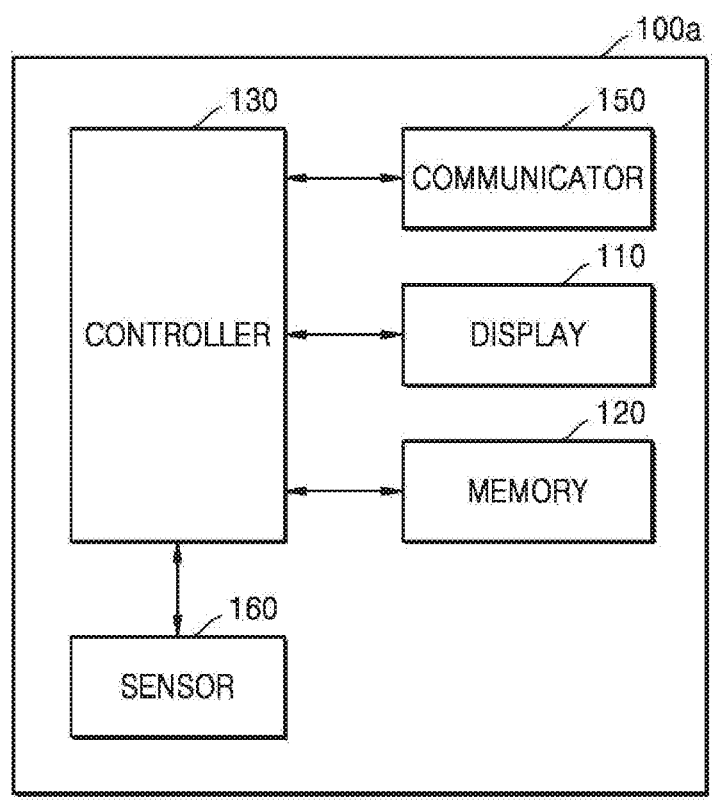
FIG. 5 is a block diagram of a structure of an image display apparatus that creates and stores angle of view information corresponding to a 360-degree image, according to an example embodiment.

FIG. 5 is a block diagram of a structure of an image display apparatus 100a that creates and stores angle of view information corresponding to a 360-degree image, according to an example embodiment. The image display apparatus 100a of FIG. 5 may be an example embodiment of the image display apparatus 100 of FIG. 1.

Referring to FIG. 5, the image display apparatus 100a may include a sensor 160, a communicator 150, a controller 130, a memory 120, and a display 110.

The display 110 may generate a driving signal by converting an image signal, a data signal, an on-screen display (OSD) signal, and a control signal that are processed by the controller 130. The display 110 may be a plasma display panel (PDP), a liquid-crystal display (LCD), an organic light-emitting device (OLED), a flexible display, or a three-dimensional (3D) display. The display 110 may be configured as a touch screen, and thus may serve as an input device as well as an output device.

The display 110 may display an image corresponding to a region of a 360-degree image that corresponds to a certain angle of view. The display 110 may also display an image corresponding to an angle of view to which the certain angle of view was adjusted in response to a user input of adjusting an angle of view.

The sensor 160 may sense a user input and transmit a signal corresponding to the sensed user input to the controller 130. Examples of the user input received from the control apparatus 30 and sensed by the sensor 160 may include turning power on/off, selecting channels, raising and lowering channels, and setting a screen. In addition, the sensor 160 may sense an input for moving the location of the region displayed on the display 110 from among the 360-degree image, an input for zooming in or out the image displayed on the display 110, and an input for displaying an image corresponding to a region at a specific location from among the 360-degree image.

The controller 130 may process an image signal and transmit the processed image signal to the display 110. Accordingly, an image corresponding to the processed image signal may be displayed on the display 110. The controller 130 may control the image display apparatus 100a via a user command detected by the sensor 160 or an internal program.

For example, according to an example embodiment, the controller 130 may move the location of the region displayed on the display 110 from among the 360-degree image according to the detected user input, and may control the display 110 to display an images corresponding to the moved region.

The controller 130 may decrease or increase the range of the region displayed on the display 110 from among the 360-degree image, according to the sensed zoom-in or zoom-out input.

According to an example embodiment, the controller 130 may create angle of view information including at least one angle of view value selected by a user to reproduce the 360-degree image, and may store the created angle of view information in the memory 120. Each angle of view value may include information about a time or a frame at which an angle of view is applied, direction information and size information representing the angle of view, and zoom size information.

According to an example embodiment, the controller 130 may reproduce a 360-degree image corresponding to the at least one angle of view value included in the angle of view information stored in the memory 120.

According to an example embodiment, the controller 130 may store the angle of view information in a file of the 360-degree image, or in a meta file separate from the file of the 360-degree image.

According to an example embodiment, the angle of view information may correspond to an object included in the 360-degree image, and may further include information for identifying the object.

According to an example embodiment, the controller 130 may receive a user input corresponding to at least one angle of view value selected to reproduce a 360-degree image corresponding to at least one of a plurality of files that constitute 360-degree content, and may create angle of view information including the at least one selected angle of view value corresponding to the at least one file and a file identifier corresponding to each angle of view value.

The memory 120 may include an operating system (OS), data processed by the controller 130, and at least one instruction executed by the controller 130.

In particular, the memory 120 may store the angle of view information created by the controller 130 to include the at least one angle of view value selected to reproduce the 360-degree image.

The communicator 150 enables the image display apparatus 100a to communicate with other electronic devices. The communicator 150 may transmit the created angle of view information or the angle of view information stored in the memory 120 to the outside.

Figure 6:
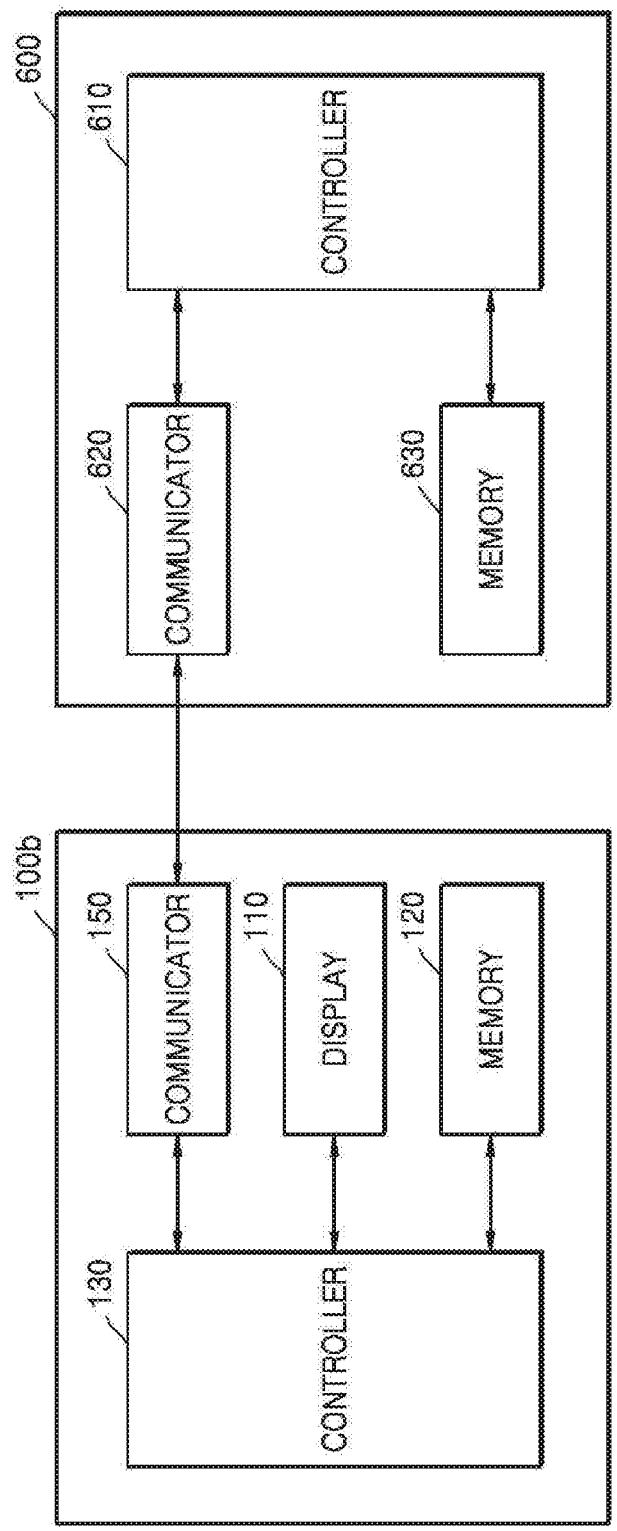
FIG. 6 is a block diagram of a structure of an image display apparatus that reproduces a 360-degree image by using angle of view information corresponding to a 360-degree image, according to an example embodiment.

FIG. 6 is a block diagram of a structure of an image display apparatus 100b reproducing a 360-degree image by using angle of view information corresponding to a 360-degree image, according to an example embodiment. The image display apparatus 100b of FIG. 6 may be an example embodiment of the image display apparatus 100 of FIG. 1.

Referring to FIG. 6, the image display apparatus 100b may include a display 110, a memory 120, a controller 130, and a communicator 150.

Functions of the display 110 and the memory 120 overlap with those of FIG. 5, and thus detailed descriptions thereof will be omitted.

The communicator 150 may perform communication with a communicator 620 of a server 600. The communicator 150 may request the server 600 for angle of view information corresponding to the 360-degree image under the control of the controller 130, and may receive the angle of view information from the server 600 in response to the request for the angle of view information.

The communicator 150 may receive the angle of view information corresponding to the 360-degree image together with or independently from the 360-degree image, or the 360-degree image may be stored in the memory 120 of the image display apparatus 100b in advance.

The controller 130 may obtain a 360-degree image and angle of view information including at least one angle of view value selected to reproduce the 360-degree image, and may display the 360-degree image according to the at least one angle of view value included in the obtained angle of view information. Each angle of view value may include information about a time or a frame at which an angle of view is applied, direction information and height information representing the angle of view, and zoom size information.

The controller 130 may obtain the angle of view information from an internal memory or may receive the angle of view information from the server 600 via a communication interface.

The controller 130 may extract the angle of view information from a file of the 360-degree image, or may obtain the angle of view information from a meta file separate from the file of the 360-degree image.

The server 600 may provide the angle of view information corresponding to the 360-degree image. The server 600 may include a controller 610, the communicator 620, and a memory 630.

The communicator 620 may transmit angle of view information stored in the memory 630 in response to the angle of view information request of the image display apparatus 100*b*. The communicator 620 may receive the angle of view information from the image display apparatus 100*b* or from another terminal.

The controller 610 controls all of the components of the server 600 including the communicator 620 and the memory 630. The controller 610 may manage the angle of view information corresponding to the 360-degree image.

According to an example embodiment, the controller 610 may manage at least one pieces of angle of view information corresponding to each of a plurality of 360-degree images. A plurality of pieces of angle of view information may be created for a single 360-degree image, and may be managed.

According to an example embodiment, a plurality of pieces of angle of view information created by a plurality of editors or manufacturers may exist for one 360-degree image.

According to an example embodiment, angle of view information corresponding to each of a plurality of objects included in one 360-degree image may exist. For example, in the case of a 360-degree image including a music video of a singer group including 5 singers, angle of view information for tracking each singer may exist.

According to an example embodiment, the controller 610 may manage a plurality of pieces of angle of view information that may be generated for one 360-degree image. In other words, the controller 610 may manage a plurality of pieces of angle of view information that may be created for one 360-degree image, and may control the user to select desired angle of view information from among the plurality of pieces of angle of view information.

The controller 610 may recommend at least one of the plurality of pieces of angle of view information to the user by monitoring, for example, the number of hits of the plurality of pieces of angle of view information or popularity thereof.

When the controller 610 receives, from the image display apparatus 100*b*, a request to search for the angle of view information for the 360-degree image, the controller 610 may search for the requested angle of view information corresponding to the 360-degree image from a database stored in the memory 630 or stored in a connected external computer, and may provide the angle of view information to the image display apparatus 100*b*. The request to search for the angle of view information may include an identifier of the 360-degree image, or include a partial captured image of the 360-degree image. When the request to search for the angle of view information includes the identifier of the 360-degree image, the controller 610 may search for angle of view information corresponding to the identifier of the 360-degree image. When the request to search for the angle of view information includes the partial captured image of the 360-degree image, the controller 610 may find an identifier of the 360-degree image including the partial captured image by using various image analysis algorithms and may search for angle of view information corresponding to the identifier of the 360-degree image.

Figure 7:
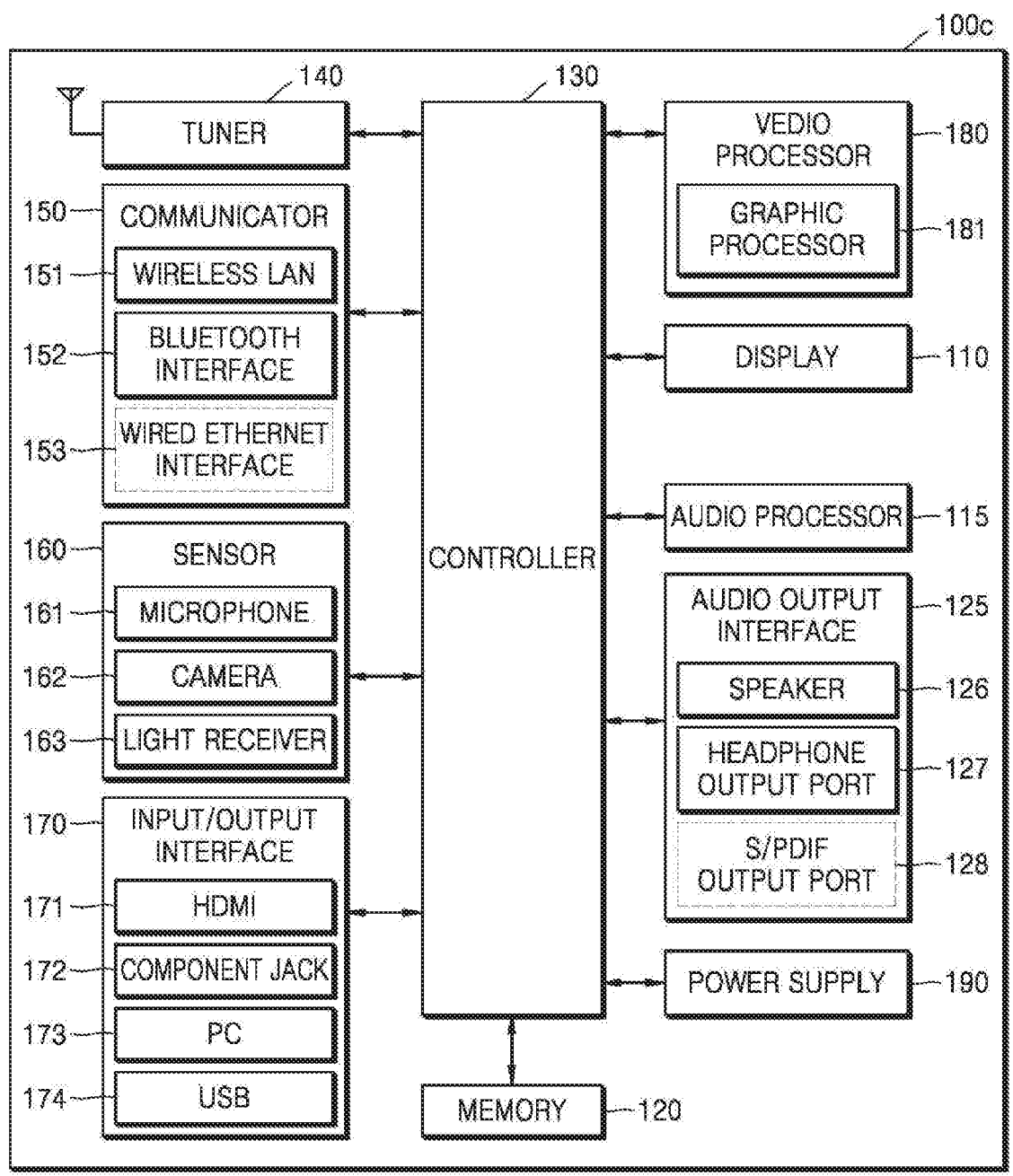
FIG. 7 is a block diagram of a structure of an image display apparatus that creates angle of view information and/or reproducing a 360-degree image by using the angle of view information, according to an example embodiment.

FIG. 7 is a block diagram of a structure of an image display apparatus 100*c* creating angle of view information and/or reproducing a 360-degree image by using the angle of view information, according to an example embodiment. The image display apparatus 100*c* of FIG. 7 may be an example embodiment of the image display apparatus 100 of FIG. 1.

Referring to FIG. 7, the image display apparatus 100*c* may further include a video processor 180, an audio processor 115, an audio output interface 125, a power supply 190, a tuner 140, a communicator 150, an input/output interface 170, and the memory 120, in addition to the controller 130, the display 110, and the sensor 160.

With regard to the controller 130, the display 110, and the sensor 160, elements and features as described with reference to FIG. 5 will not be repeated.

The video processor 180 processes video data that is received by the image display apparatus 100*c*. The video processor 180 may perform a variety of image processing, such as decoding, scaling, noise filtering, frame rate transformation, and resolution transformation, on the received video data.

A graphics processor 181 generates a screen image including various objects, such as an icon, an image, and a text, by using an arithmetic unit and a rendering unit. The arithmetic unit calculates attribute values, such as a coordinate value, a shape, a size, a color, and the like, with which each object is to be displayed according to layouts of the screen image, based on a user input sensed by the sensor 160. The rendering unit generates screen images of various layouts including objects, based on the attribute values calculated by the arithmetic unit. The screen images generated by the rendering unit are displayed on a display area of the display 110. As described above with reference to FIG. 1, the graphics processor 181 may map a 360-degree image in a planar shape to a sphere to generate a 360-degree image in a spherical shape.

The display 110 displays video included in a broadcasting signal received via the tuner 140 on the screen thereof, under the control of the controller 130. The display 110 may also display content (for example, a moving picture) that is input via the communicator 150 or the input/output interface 170. The display 110 may output an image stored in the memory 120 under the control of the controller 130. The display 110 may also display a voice user interface (UI) (e.g., including a voice command word guide) for performing a voice recognition task corresponding to voice recognition, or a motion UI (e.g., including a user motion guide for motion recognition and gesture recognition) for performing a motion recognition task corresponding to motion recognition (e.g., gesture recognition).

The audio processor 115 processes audio data. The audio processor 115 may perform a variety of processing, such as decoding, amplification, or noise filtering, on the audio data. The audio processor 115 may include a plurality of audio processing modules to process audios corresponding to a plurality of pieces of content.

The audio output interface 125 outputs audio included in a broadcasting signal received via the tuner 140, under the control of the controller 130. The audio output interface 125 may also output audio (for example, a voice or a sound) that is input via the communicator 150 or the input/output interface 170. The audio output interface 125 may also output audio stored in the storage 190 under the control of the controller 130. The audio output interface 125 may include at least one selected from a speaker 126, a headphone output port 127, and a Sony/Philips Digital Interface (S/PDIF) output port 128. The audio output interface 125 may include any combination of the speaker 126, the headphone output port 127, and the S/PDIF output port 128.

The tuner 140 may tune and select only a frequency of a channel which the image display apparatus 100c wants to receive from among many radio wave components that are obtained via amplification, mixing, resonance, or the like of a wired or wireless broadcasting signal. The broadcasting signal includes audio, video, and additional information (for example, an electronic program guide (EPG)).

The tuner 140 may receive a broadcasting signal in a frequency band corresponding to a channel number (e.g., cable broadcasting No. 506) according to a user input (for example, a control signal received from the control apparatus 30, e.g., a channel number input, a channel up-down input, and a channel input on an EPG screen image).

The tuner 140 may receive a broadcasting signal from various sources, such as terrestrial broadcasting, cable broadcasting, satellite broadcasting, and Internet broadcasting. The tuner 140 may also receive a broadcasting signal from a source such as analog broadcasting or digital broadcasting. The broadcasting signal received via the tuner 140 is decoded (for example, audio decoding, video decoding, or additional information decoding) and is thus divided into audio, video, and/or additional information. The audio, the video, and/or the additional information may be stored in the memory 120 under the control of the controller 130.

The image display apparatus 100c may include a single tuner 140 or a plurality of tuners 140. The tuner 140 may be all-in-one with the image display apparatus 100c, or implemented as a separate apparatus (for example, a tuner that is connected to a set-top box and the input/output interface 170) having a tuner that is electrically connected to the image display apparatus 100c.

The communicator 150 may connect the image display apparatus 100c to an external apparatus (for example, an audio apparatus) under the control of the controller 130. The controller 130 may transmit/receive content to/from the external apparatus connected via the communicator 150, download an application from the external apparatus, or perform web-browsing. The communicator 150 may include a wireless local area network (LAN) 151, a Bluetooth interface 152, or a wired Ethernet interface 153 in correspondence to a performance and a structure of the image display apparatus 100c. The communicator 150 may include a combination of the wireless LAN 151, the Bluetooth interface 152, and the wired Ethernet interface 153. The communicator 150 may receive a control signal of the control apparatus 30 under the control of the controller 130. The control signal may be implemented as a Bluetooth signal, a radio frequency (RF) signal, or a Wi-Fi signal.

The communicator 150 may further include short-range communication (for example, near field communication (NFC) or Bluetooth low energy (BLE)), in addition to the Bluetooth interface 152.

According to an example embodiment, the communicator 150 may request a server for angle of view information corresponding to a 360-degree image and may receive the angle of view information from the server in response to the request.

The sensor 160 senses a voice of a user, an image of the user, or an interaction with the user, and may include a microphone 161, a camera 162, and a light receiver 163.

The microphone 161 receives an uttered voice of the user. The microphone 161 may transform the received voice into an electrical signal and output the electrical signal to the controller 130. The user voice may include, for example, a voice corresponding to a menu or function of the image display apparatus 100c. According to an example embodiment, a user input of controlling an angle of view may be received via the microphone 161.

The camera 162 may capture an image (for example, consecutive frames) corresponding to a motion of the user including a gesture within a recognition range of the camera 162. The controller 130 may select a menu that is displayed on the image display apparatus 100c by using a result of the recognition of the received motion, or perform control corresponding to the result of the motion recognition. For example, the control may be channel adjustment, volume adjustment, indicator movement, cursor movement, and movement of a region displayed on a display from among the 360-degree image.

The light receiver 163 receives an optical signal (e.g., a control signal) from the control apparatus 30 via a light window of the bezel of the display 110. The light receiver 163 may receive an optical signal corresponding to a user input (e.g., touch, pressing, a touch gesture, a voice, or a motion) from the control apparatus 30. A control signal may be extracted from the received optical signal under the control of the controller 130. For example, a user input of controlling an angle of view may be received via the light receiver 163.

The input/output interface 170 receives video (e.g., a moving picture), audio (e.g., a voice or music), and additional information (e.g., an EPG) from outside the image display apparatus 100c under the control of the controller 130. The input/output interface 170 may include a High-Definition Multimedia Interface (HDMI) port 171, a component jack 172, a PC port 173, or a USB port 174. The input/output interface 170 may include any combination of the HDMI port 171, the component jack 172, the PC port 173, and the USB port 174.

The controller 130 controls an overall operation of the image display apparatus 100c and signal transfer among the internal components of the image display apparatus 100c and processes data. When there is an input of a user or stored preset conditions are satisfied, the controller 130 may execute an OS and various applications that are stored in the memory 120.

The controller 130 may include random-access memory (RAM) that stores a signal or data input by an external source of the image display apparatus 100c or is used as a memory area for various operations performed by the image display apparatus 100c, read-only memory (ROM) that stores a control program for controlling the image display apparatus 100c, and a processor.

The controller 130 may create angle of view information including at least one angle of view value corresponding to a user input of controlling an angle of view while reproducing the 360-degree image, by executing at least one instruction stored in the memory 120.

The controller 130 may reproduce the 360-degree image by using the angle of view information stored in the memory 120 or the angle of view information received from the server or may edit the angle of view information, by executing the at least one instruction stored in the memory 120.

The processor may include a graphics processing unit for performing video graphics processing. The processor may be implemented by using a System On Chip (SoC) into which a core and a GPU are incorporated. The processor may include a single core, a dual core, a triple core, a quad core, or a multiple core thereof.

The processor may include a plurality of processors. For example, the processor may be implemented by using a main processor and a sub-processor operating in a sleep mode.

The memory 120 may store various data, programs, or applications for driving and controlling the image display apparatus 100c under the control of the controller 130. The memory 120 may store input/output signals or data corresponding to driving of the video processor 180, the display 110, the audio processor 115, the audio output interface 125, the power supply 190, the tuner 140, the communicator 150, the sensor 160, and the input/output interface 170. The memory 120 may store a control program for controlling the image display apparatus 100c and the controller 130, an application initially provided by a manufacturer or downloaded from outside the image display apparatus 100c, a graphical user interface (GUI) associated with the application, objects (for example, an image text, an icon, and a button) for providing the GUI, user information, a document, databases, or related pieces of data.

According to an example embodiment, the memory 120 may include at least one application including at least one instruction for creating angle of view information, at least one instruction for storing the created angle of view information, at least one instruction for reading out the stored angle of view information, at least one instruction for editing read-out angle of view information, and at least one instruction for reproducing a 360-degree image by using the angle of view information.

According to an example embodiment, the term "memory" includes the memory 120, the ROM or the RAM of the controller 130, or a memory card (e.g., a micro SD card or a USB memory) mounted in the image display apparatus 100c. The memory 120 may include a non-volatile memory, a volatile memory, a hard disk drive (HDD), or a solid state drive (SSD).

The image display apparatus 100c having the display 110 may be electrically connected to an external apparatus (e.g., a set-top box) having a tuner. For example, the image display apparatus 100c may be implemented by using an analog TV, a digital TV, a 3D TV, a smart TV, an LED TV, an OLED TV, a plasma TV, a monitor, and the like, but it will be understood by one of ordinary skill in the art that example embodiments are not limited thereto.

The block diagrams of the image display apparatuses 100a and 110b shown in FIGS. 5 and 6 are merely example embodiments. Components illustrated in FIGS. 5 and 6 may be combined or omitted according to specifications of the image display apparatus 100 when being actually implemented, or additional components may be included in the block diagrams of FIGS. 5 and 6. In other words, two or more components may be combined into a single component, or a single component may be divided into two or more components. A function performed in each block is merely an example to explain example embodiments, and a detailed operation or device of each block does not limit the scope of the example embodiments.

According to example embodiments, a method of creating angle of view information will now be described.

Figure 8:
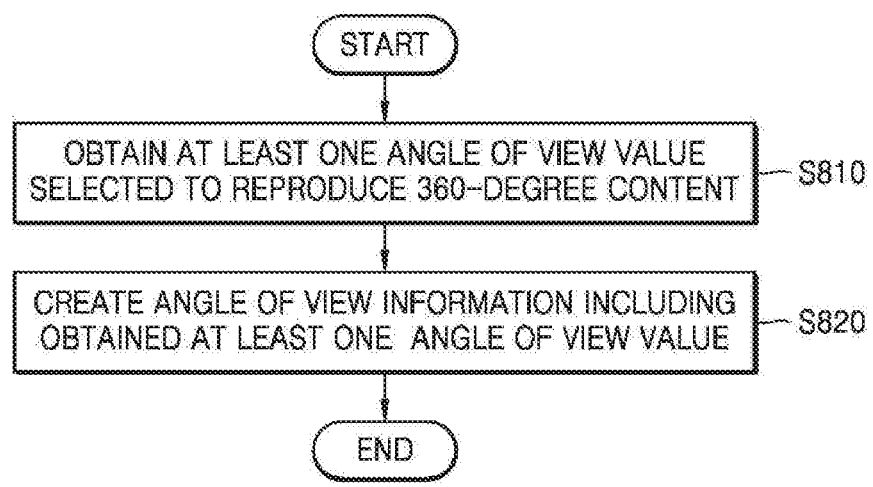
FIG. 8 is a flowchart of a method of creating angle of view information in an image display apparatus, according to an example embodiment.

FIG. 8 is a flowchart of a method of creating angle of view information in an image display apparatus, according to an example embodiment.

Referring to FIG. 8, in operation S810, the image display apparatus may obtain at least one angle of view value selected to reproduce 360-degree content.

The image display apparatus may receive a user input including an event for controlling an angle of view of the 360-degree content while reproducing the 360-degree content. For example, the user may control the angle of view by using the control apparatus 30, or, when an image display apparatus including a touch-sensitive screen is used, the user may control the angle of view via a finger movement on the touch-sensitive screen. The image display apparatus may obtain at least one angle of view value from such a user input for controlling the angle of view.

In operation S820, the image display apparatus may create angle of view information including the obtained at least one angle of view value.

The image display apparatus may store the angle of view information in a file of the 360-degree content or in a file separate from the file of the 360-degree content.

A method of creating angle of view information will now be described in more detail with reference to FIGS. 9-11.

Figure 9:
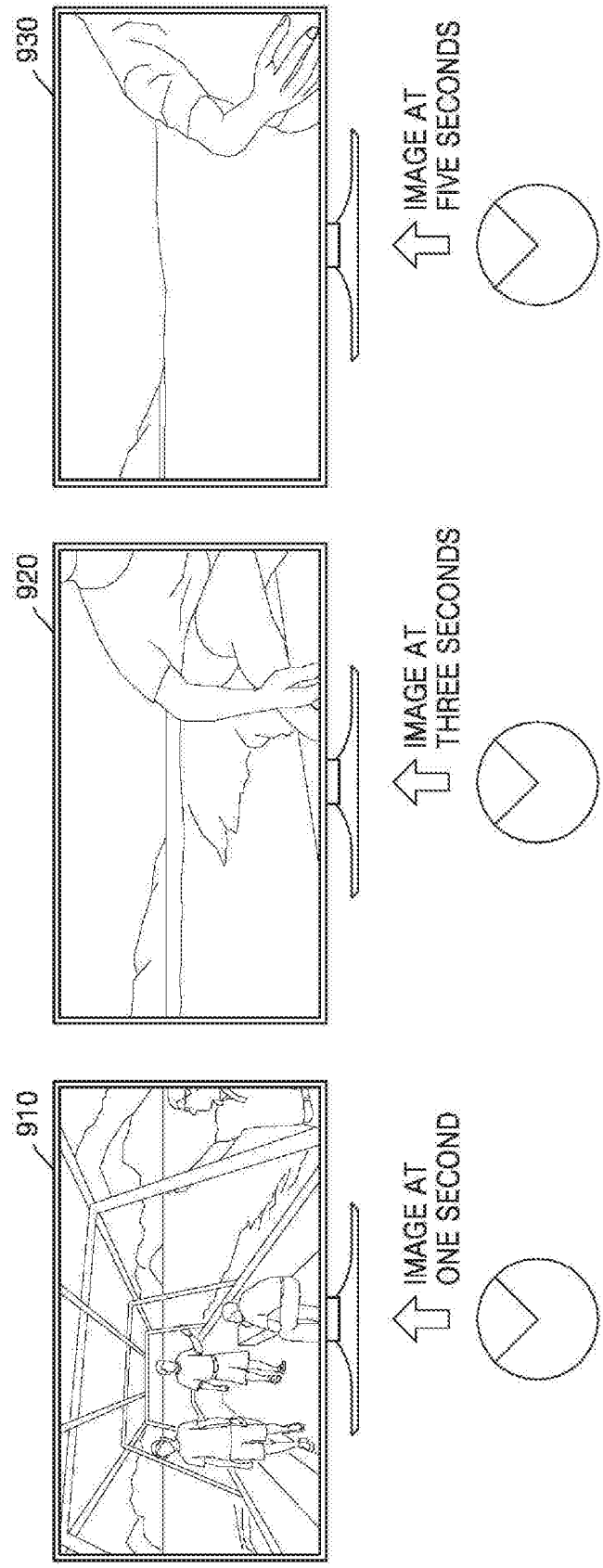
FIG. 9 is a reference diagram of an example illustrating the necessity of adjusting an angle of view during reproduction of a 360-degree image, according to an example embodiment.

FIG. 9 is a reference diagram of an example illustrating the necessity of adjusting an angle of view during reproduction of a 360-degree image.

Referring to FIG. 9, reference numeral 910 indicates a 360-degree image at one second, reference numeral 920 indicates a 360-degree image at three seconds, and reference numeral 930 indicates a 360-degree image at five seconds. Via a 360-degree image, a user may show an image corresponding to any angle of view of 360 degrees at one time point. However, when the user does not manipulate an angle of view, the angle of view of the 360-degree image may not change, and only a portion of the 360-degree image at one angle of view may be shown. In a 360-degree image as shown in FIG. 9, if there is no angle of view adjustment, a user may view meaningless images in which an object, (e.g., a person), is not properly shown, from the images 920 and 930. Accordingly, in this case, angle of view adjustment of the 360-degree image may be necessary.

Figure 10:
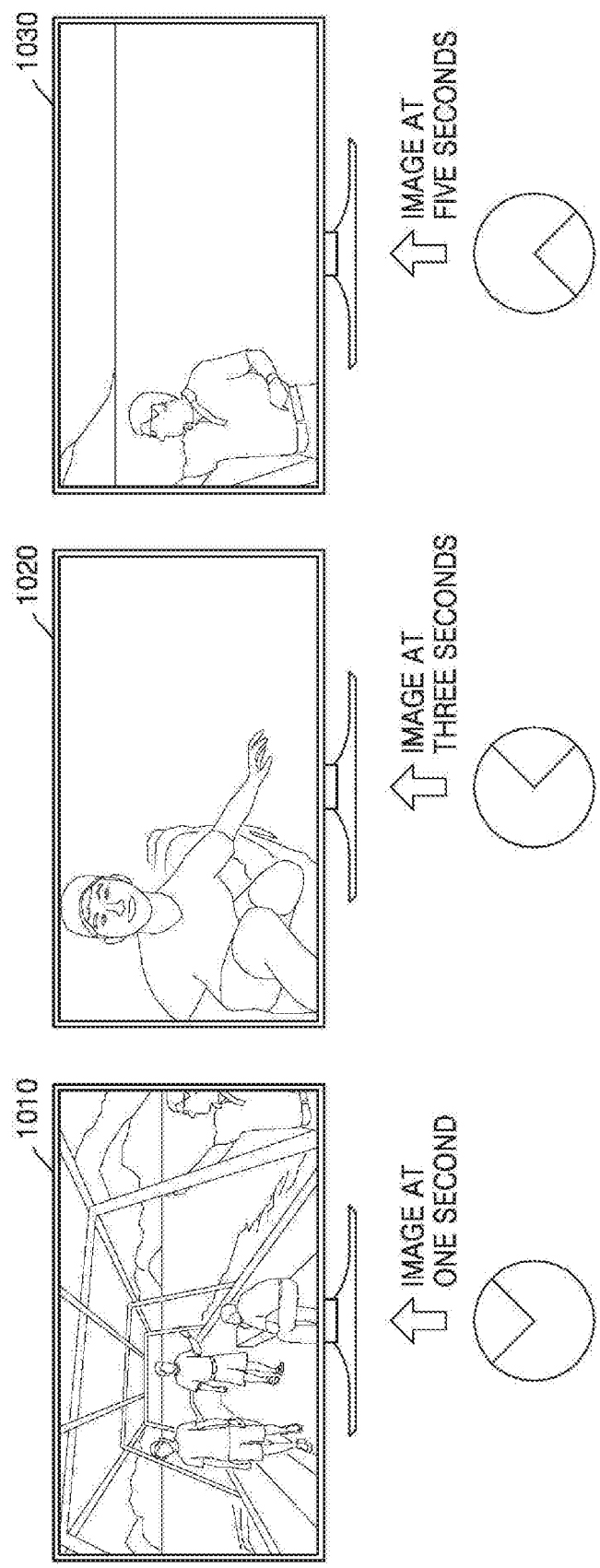
FIG. 10 is a reference diagram for illustrating screen images obtained by adjusting an angle of view during reproduction of a 360-degree image, according to an example embodiment.

FIG. 10 is a reference diagram for illustrating screen images obtained by adjusting an angle of view during reproduction of a 360-degree image. Referring to FIG. 10, reference numeral 1010 indicates a 360-degree image at one second, reference numeral 1020 indicates a 360-degree image at three seconds, and reference numeral 1030 indicates a 360-degree image at five seconds. The image 1010 is an image at one second like the image 910 of FIG. 9. However, referring to the image 1020, a user moved an angle of view by 90 degrees rightwards on the image at three seconds, and thus a desired object may be displayed on the image 1020. In the image 1030, the user moves the angle of view by 180 degrees on the image at five seconds, and thus a rear part of the 360-degree image may be shown.

According to example embodiments, an image display apparatus may create angle of view information including, for example, an angle of view value according to a user input at three seconds, namely, 90 degrees, and an angle of view value according to a user input at five seconds, namely, 180 degrees.

Figure 11:
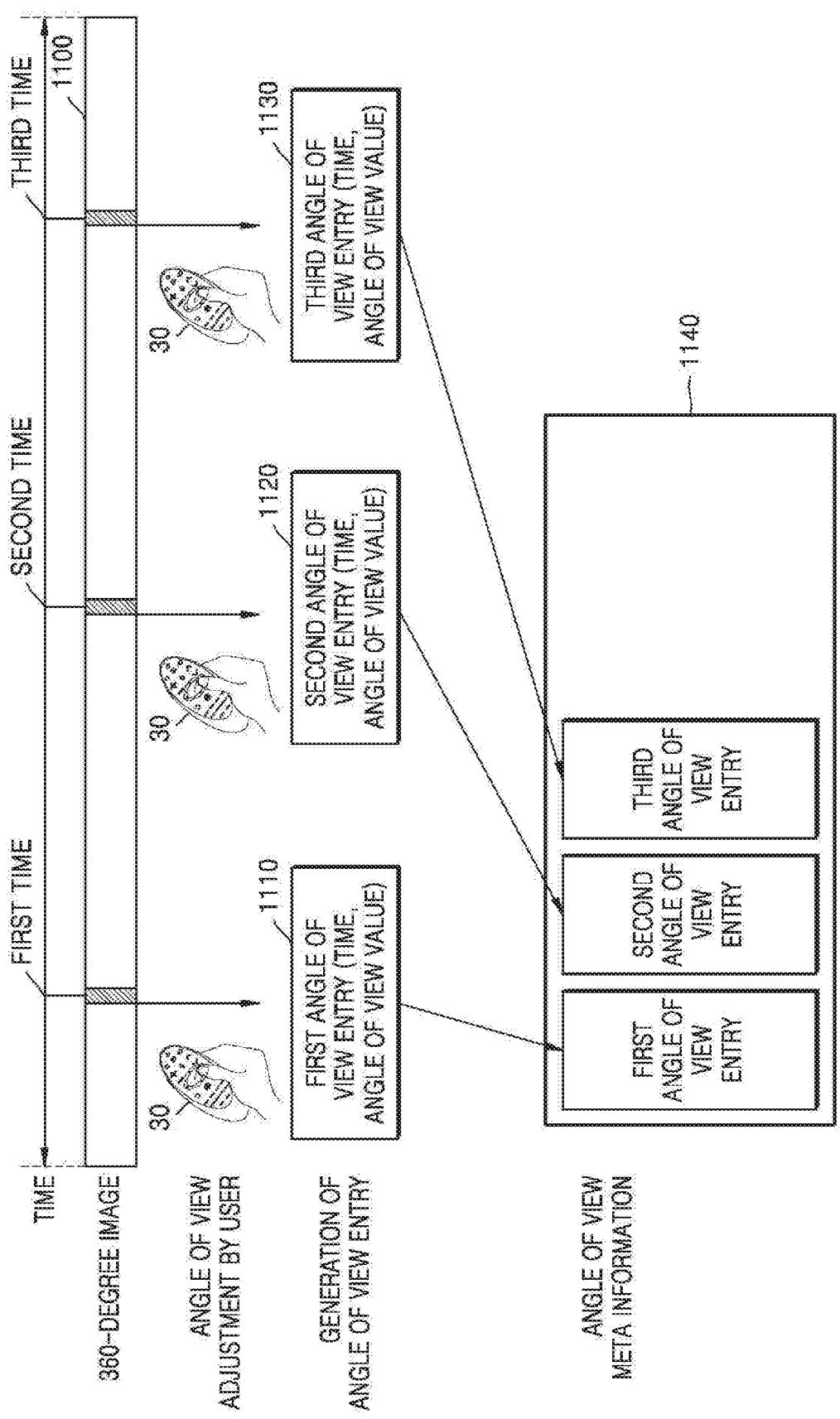
FIG. 11 is a reference diagram illustrating a method of generating an angle of view meta file based on a 360-degree image, according to an example embodiment.

FIG. 11 is a reference diagram illustrating a method of generating an angle of view meta file based on a 360-degree image, according to an example embodiment.

Referring to FIG. 11, an image display apparatus may generate a first angle of view entry 1110, in response to a user input of adjusting an angle of view at a first time point while reproducing a 360-degree image 1100. The first angle of view entry 1110 may include the time point at which the angle of view was adjusted, and an angle of view value. Likewise, the image display apparatus may generate a second angle of view entry 1120 according to a user input of adjusting the angle of view at a second time point, and may generate a third angle of view entry 1130 according to a user input of adjusting the angle of view at a third time point. When all angle of view entries generated for the 360-degree image 1100 are collected, the image display apparatus may generate angle of view meta information 1140 including the angle of view entries.

FIG. 12 is a reference diagram illustrating a method of reproducing a 360-degree image by using angle of view meta information generated based on the 360-degree image, according to an example embodiment.

Referring to FIG. 12, when reproducing the 360-degree image 1100, the image display apparatus may adjust an angle of view by using the pre-generated angle of view meta information 1140. In other words, when reproducing the 360-degree image 1100, the image display apparatus may refer to time information of an angle of view entry included in the angle of view meta information 1140, and, when a time corresponding to the time information arrives, may adjust the 360-degree image to an angle of view value included in the angle of view entry. In detail, when the first time point included in the first angle of view entry 1110 arrives, the image display apparatus may adjust the 360-degree image to an angle of view value included in the first angle of view entry 1110. Likewise, when the second time point included in the second angle of view entry 1120 arrives, the image display apparatus may adjust the 360-degree image to an angle of view value included in the second angle of view entry 1120, and, when the third time point included in the third angle of view entry 1130 arrives, the image display apparatus may adjust the 360-degree image to an angle of view value included in the third angle of view entry 1130.

As such, the image display apparatus reproduces a 360-degree image by using angle of view meta information including at least one angle of view value, thereby enabling the 360-degree image to be reproduced according to pre-created angle of view tracking information.

Figure 13A:
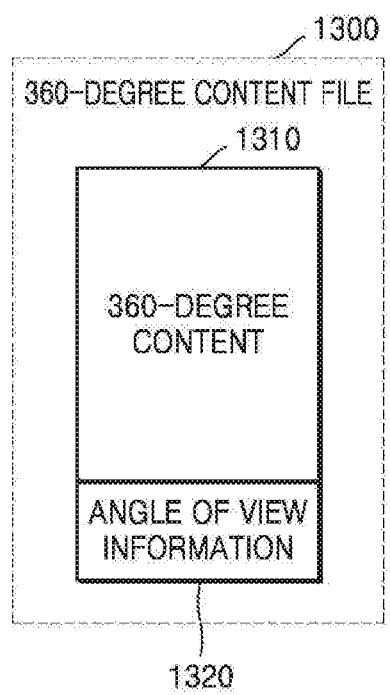
FIGS. 13A and 13B are reference diagrams illustrating a storage location of angle of view information according to an example embodiment.
Figure 13B:
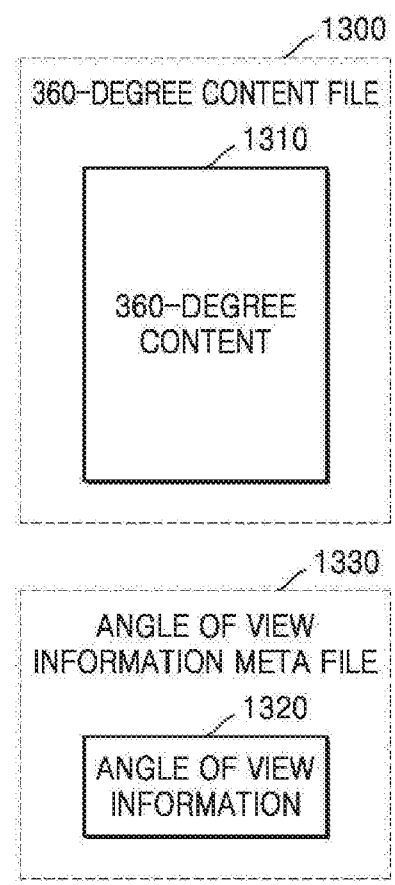

FIGS. 13A and 13B are reference diagrams illustrating a storage location of angle of view information according to an example embodiment.

Referring to FIG. 13A, angle of view information 1320 may be stored in a portion of a 360-degree content file 1300, together with 360-degree content 1310. In other words, the angle of view information 1320 may constitute the 360-degree content file 1300.

Referring to FIG. 13B, the angle of view information 1320 may be stored in an angle of view information meta file 1330, separately from the 360-degree content file 1300. When angle of view information is managed as a file separate from a 360-degree content file, editing the angle of view information may be easier, and circulating the angle of view information may be convenient.

Figure 14:
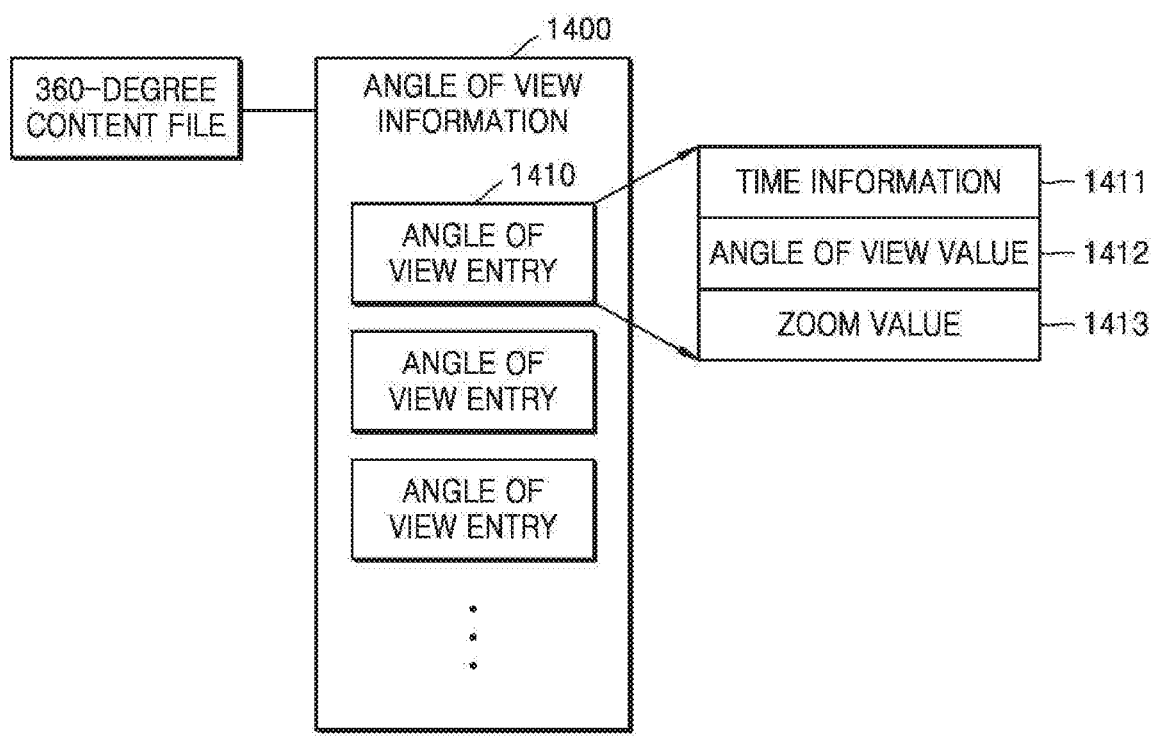
FIG. 14 is a schematic diagram for illustrating an example of angle of view information according to an example embodiment.

FIG. 14 is a schematic diagram for illustrating an example of angle of view information according to an example embodiment.

Referring to FIG. 14, angle of view information 1400 may be created for a single 360-degree content file. The angle of view information 1400 may include at least one angle of view entry. Each angle of view entry 1410 may include time information 1411 about a time point at which an angle of view was adjusted, an angle of view value 1412, and a zoom value 1413. The time information 1411 is not necessarily represented as a time, and may be represented as a frame number as long as the frame number is able to represent a time point at which an angle of view was controlled. The angle of view value 1412 may include, for example, an x-coordinate and a y-coordinate of the angle of view. The zoom value 1413 may indicate a size representing the degree of zoom-in or zoom-out.

Figure 15:
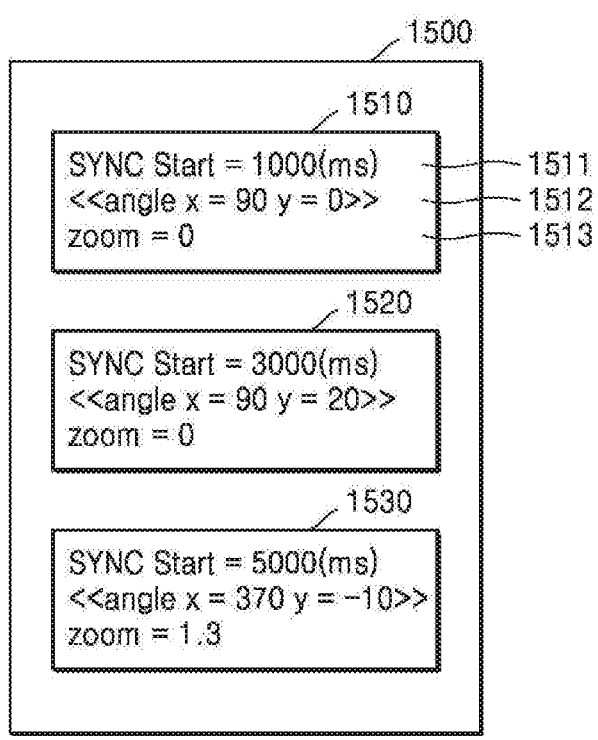
FIG. 15 is a block diagram for illustrating angle of view information, which is an example of the angle of view information of FIG. 14, according to an example embodiment.

FIG. 15 is a block diagram for illustrating angle of view information 1500, which is an example of the angle of view information 1400 of FIG. 14.

Referring to FIG. 15, the angle of view information 1500 may include an angle of view entry 1510, an angle of view entry 1520, and an angle of view entry 1530. Each angle of view entry may include time information, an angle of view value, and a zoom value. For example the angle of view entry 1510 indicates 1000 ms as time information 1511, x=90 and y=0 as an angle of view value 1512, and 0 as a zoom value 1513.

Figure 16:
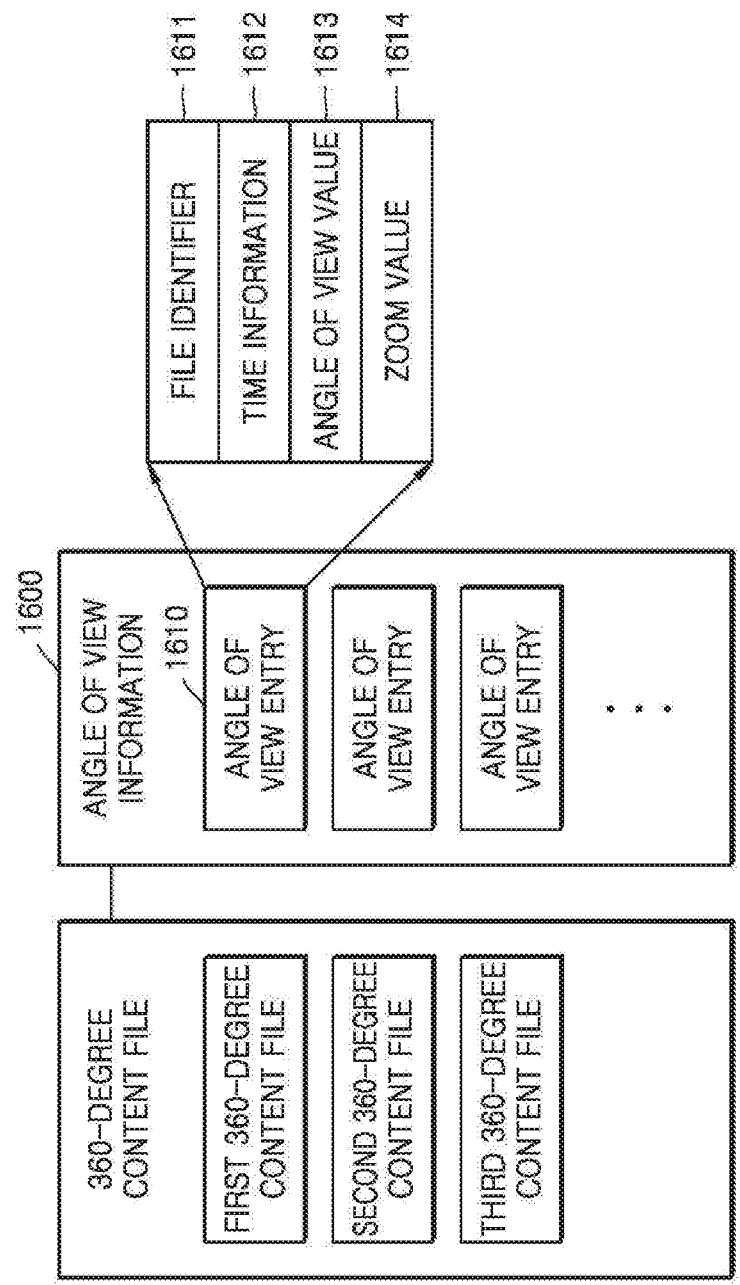
FIG. 16 is a schematic diagram for illustrating an example of angle of view information according to an example embodiment.

FIG. 16 is a schematic diagram for illustrating an example of angle of view information according to an example embodiment.

360-degree content may include a plurality of files. For example, a music video may be produced by using a plurality of 360-degree cameras instead of using a single 360-degree camera. A single scene may be photographed by simultaneously using three 360-degree cameras among which a first camera is arranged in front, a second camera is arranged on the left, and a third camera is arranged on the right, thereby obtaining three 360-degree content files.

When 360-degree content includes a plurality of files as described above, a single piece of angle of view information may be created for the plurality of files. In other words, a user may include angle of view adjustment information about the plurality of files in a single angle of view information file by, for example, adjusting an angle of view while reproducing a first file in a first time section and adjusting an angle of view while reproducing a second file in a second time section that is next to the first time section.

Referring to FIG. 16, the 360-degree content includes first, second, and third 360-degree content files. Angle of view information 1600 corresponding to the 360-degree content may include at least one angle of view entry. Each angle of view entry 1610 may include a file identifier 1611, time information 1612, an angle of view value 1613, and a zoom value 1614. The time information 1612, the angle of view value 1613, and the zoom value 1614 are similar to time information 1411, the angle of view value 1412, and the zoom value 1413 described with reference to FIG. 14, and the file identifier 1611 may indicate an identifier of a 360-degree content file to which a corresponding angle of view value is applied. For example, an angle of view entry may indicate an identifier of the first 360-degree content file, and another angle of view entry may indicate an identifier of the second 360-degree content file.

Figure 17:
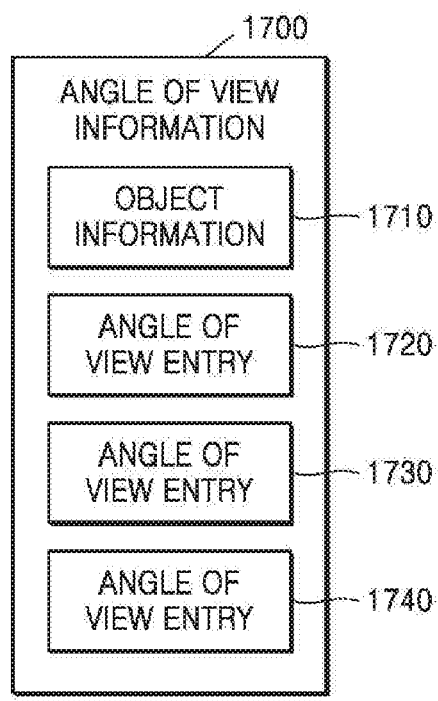
FIG. 17 is a block diagram of angle of view information including object information, according to an example embodiment.

FIG. 17 is a block diagram of angle of view information including object information, according to an example embodiment.

According to an example embodiment, angle of view information may further include object information. When a user creates angle of view information for one of a plurality of objects included in 360-degree content as shown in FIG. 3B, the angle of view information may further include object information. For example, when angle of view information is created by a user tracking a singer A from among a plurality of singers appearing in a 360-degree music video and adjusting a 360-degree image to angles of view at which the singer A appears, the angle of view information may include, as object information, information about the singer A, which is a corresponding object.

Referring to FIG. 17, angle of view information 1700 may include object information 1710, an angle of view entry 1720, an angle of view entry 1730, and an angle of view entry 1740. The angle of view entries 1720, 1730, and 1740 similar to those described with reference to FIGS. 14-16. The object information 1710 is used to identify an object corresponding to the angle of view information 1700, and thus may include an object identifier. The object is an entity appearing in 360-degree content, and thus may be any entity that may be tracked according to angles of view. For example, the object may be any entity, such as a singer appearing in a music video, an athlete or a ball appearing in a sports video, or an object, an animal, and the like appearing in various videos.

A user may manually create angle of view information while reproducing 360-degree content or the angle of view information may be created automatically.

Figure 18:
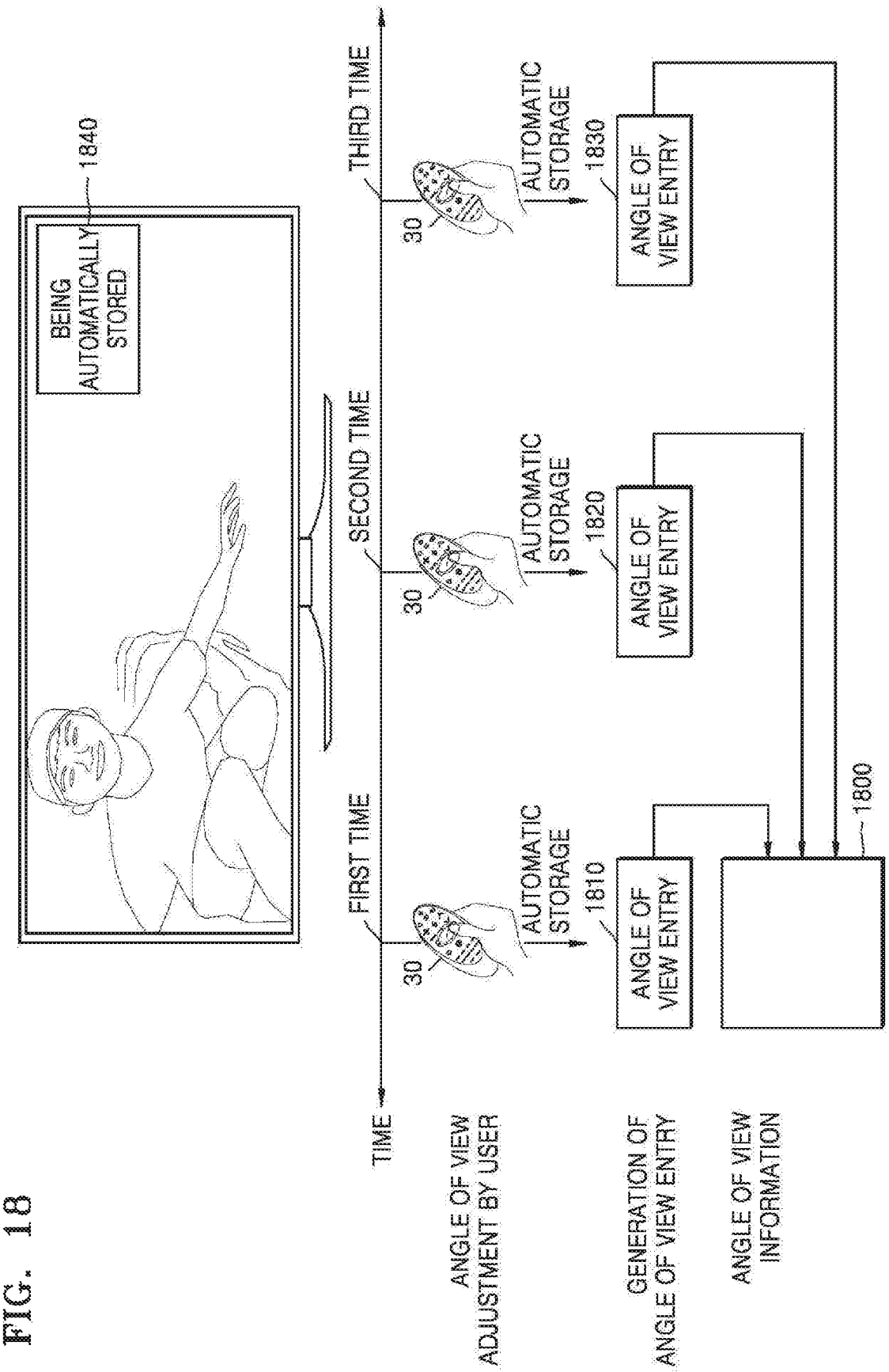
FIG. 18 is a reference diagram illustrating an example of automatically generating angle of view information according to an example embodiment.

FIG. 18 is a reference diagram illustrating an example of automatically generating angle of view information according to an example embodiment.

Referring to FIG. 18, in an automatic mode, a user may select a menu option for automatically storing angle of view information. The user may select the menu option before playing (e.g., starting reproduction of) 360-degree content or anytime during reproduction of the 360-degree content. The image display apparatus 100 may, for example, display a message 1840 on a display to indicate the state in which angle of view information is being stored (e.g., automatic storage of angle of view information).

In the automatic mode, the image display apparatus 100 may store, as angle of view information, an angle of view value that is determined according to an angle of view control event by the user when the angle of view control event occurs during reproduction of the 360-degree content. The angle of view control event may be an event representing that a user input of controlling an angle of view has occurred by using a control apparatus 30, a finger, or the like.

Referring to FIG. 18, at a first time, a second time, and a third time when the angle of view control event by the user occurs, the image display apparatus 100 may automatically generate angle of view entries 1810, 1820, and 1830 including angle of view values corresponding to corresponding angle of view control events and automatically store the angle of view entries 1810, 1820, and 1830 as angle of view information 1800. In other words, when a user simply controls 360-degree content to a desired angle of view while watching the 360-degree content, an image display apparatus may automatically create an input angle of view value as angle of view information.

Figure 19:
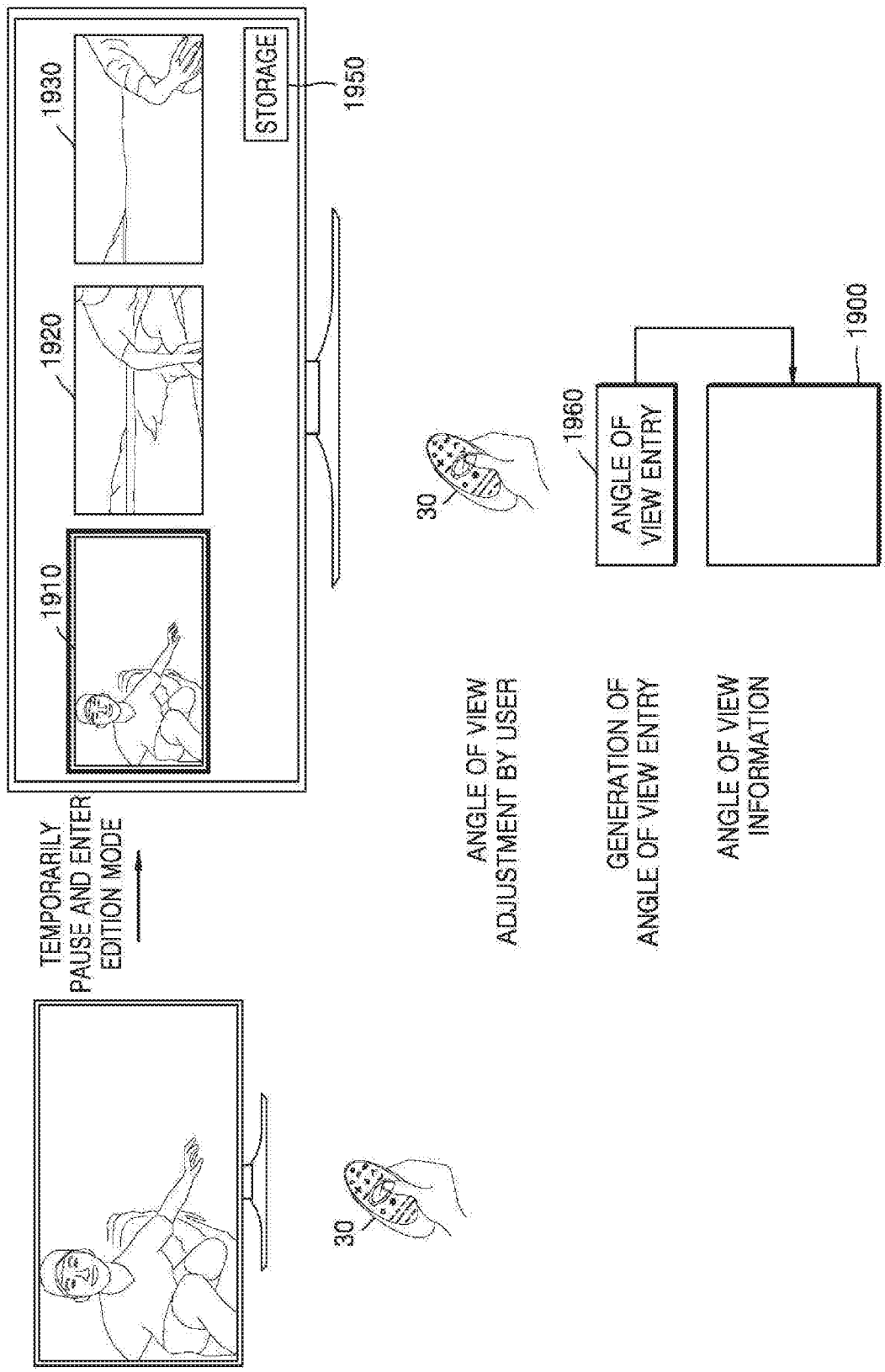
FIG. 19 is a reference diagram illustrating an example of manually creating angle of view information according to an example embodiment.

FIG. 19 is a reference diagram illustrating an example of manually creating angle of view information according to an example embodiment.

In a manual mode, a user may store angle of view information by pausing a screen image at a desired moment while watching 360-degree content and by entering an editing mode.

Referring to FIG. 19, a user may pause reproduction of a screen image and enter the editing mode at the moment when the user wants to store angle of view information. When the user has entered the editing mode, an image display apparatus may display on a display several video frames 1910, 1920, and 1930 around the time point when the user wants to store angle of view information. The user may select a video frame on which an angle of view is wanted to be controlled from among the several video frames 1910, 1920, and 1930 displayed on the display, and may control the angle of view of the selected video frame. When the user selects an angle of view and then selects a <storage>menu 1950 displayed on the display, the image display apparatus may generate an angle of view entry 1960 by using an angle of view value selected from the selected video frame and may store the angle of view entry 1960 in angle of view information 1900.

According to an example embodiment, a user may edit created angle of view information. When the angle of view information is created as an angle of view information file independent from 360-degree content, the angle of view information file may be stored in, for example, a text file, and thus the user may open the text file and easily correct or edit the angle of view information.

According to an example embodiment, the user may open the text file including the angle of view information, and correct or edit an angle of view value or a zoom value included in an angle of view entry.

According to an example embodiment, the image display apparatus may automatically correct the created angle of view information. For example, the angle of view information created due to angle of view control by the user may include an angle of view value such that reproduction is inconvenient according to the proficiency of angle of view control by the user. For example, when the user rapidly changes the zoom value or rapidly changes the angle of view within a short time period, reproduction of the 360-degree content according to angle of view information created for this change may be unnatural and may be bothersome to the user. Accordingly, the image display apparatus may search for a time section that causes unnatural image reproduction, by scanning the angle of view values and the zoom values of angle of view entries included in the created angle of view information, and may insert an adjustment entry that enables an image to be naturally reproduced during the found time section.

Figure 20:
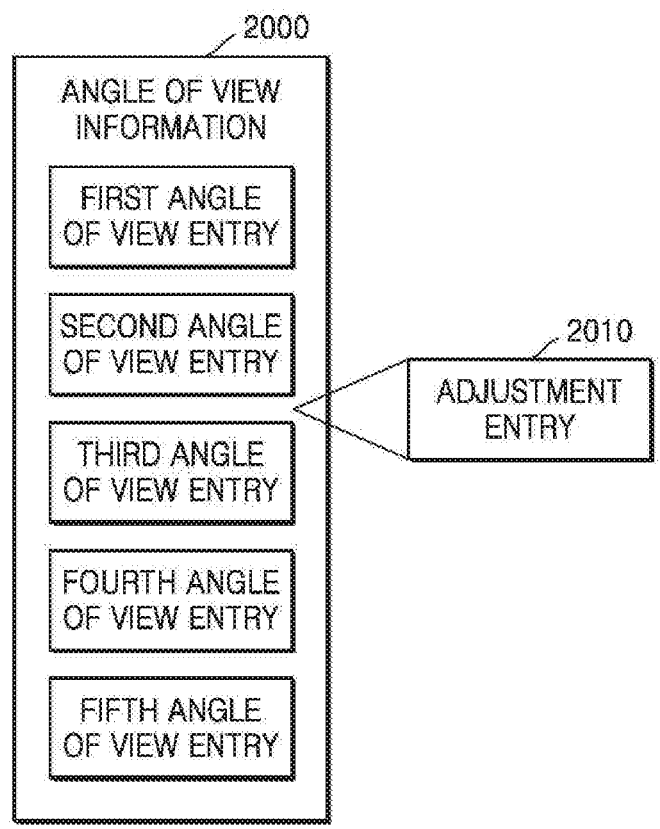
FIG. 20 is a schematic diagram for illustrating angle of view information including adjustment entry, according to an example embodiment.

FIG. 20 is a schematic diagram for illustrating angle of view information including adjustment entry, according to an example embodiment.

Referring to FIG. 20, angle of view information 2000 includes first through fifth angle of view entries. An image display apparatus may search for a time section that causes unnatural image reproduction, by scanning the first through fifth angle of view entries included in the angle of view information 2000, and may insert an adjustment entry 2010 into the angle of view information 2000. An adjustment entry may be inserted between angle of view entries, and may include an instruction enabling an angle of view value to be smoothly changed or an instruction enabling a zoom value to be smoothly changed. For example, the image display apparatus may insert an adjustment entry when an angle of view value exceeding a predetermined threshold is changed during a time period between time points indicated by angle of view entries. Alternatively, the image display apparatus may insert an adjustment entry when a zoom value exceeding a predetermined threshold is changed during a time period between time points indicated by angle of view entries.

Figure 21:
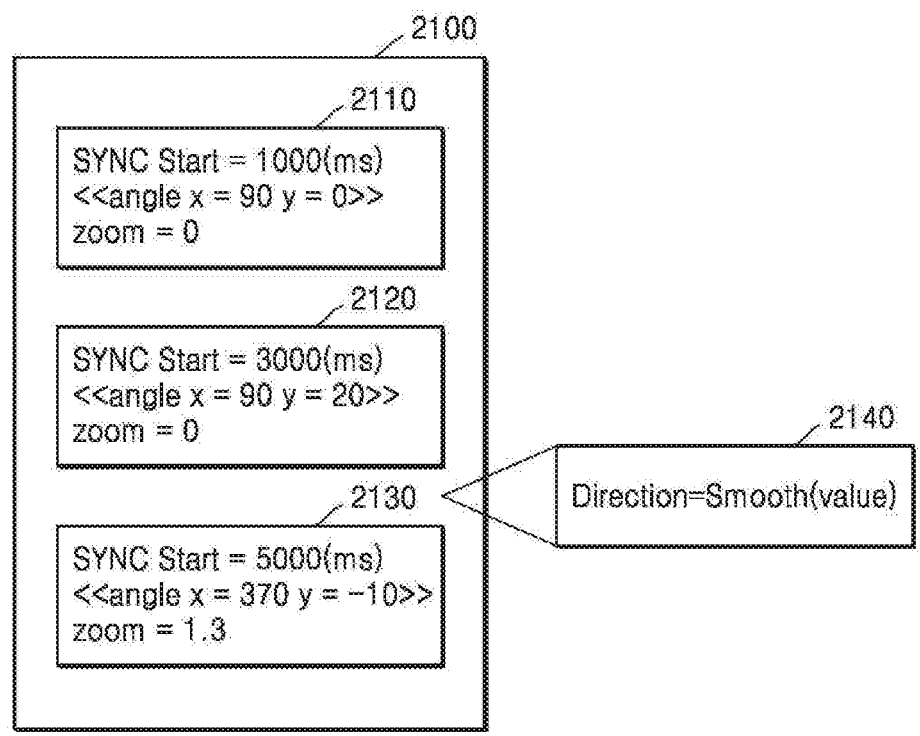
FIG. 21 is a schematic diagram for an example illustrating the adjustment entry of FIG. 20, according to an example embodiment.

FIG. 21 is a schematic diagram for an example illustrating the adjustment entry 2010 of FIG. 20.

Referring to FIG. 21, angle of view information 2100 may include an angle of view entry 2110, an angle of view entry 2120, and an angle of view entry 2130. The image display apparatus may scan the angle of view entries 2120 and 2130 and find out that the x coordinate of an angle of view rapidly changed from 90 degrees to 370 degrees during a time period between 3000 ms and 5000 ms. The image display apparatus may check that the angle of view was changed by 280 degrees during a time period of 2000 ms, and may determine this change as an angle of view change that is burdensome to users. In this case, the image display apparatus may insert an adjustment entry 2140 between the angle of view entries 2120 and 2130. The adjustment entry 2140 may include an instruction Direction=Smooth (value). The instruction Direction=Smooth (value) may refer to an instruction to reproduce frames, the number of which corresponds to "value" in the instruction, between a time value included in the angle of view entry 2120 and a time value included in the angle of view entry 2130. For example, when Direction=Smooth(100), this may mean that 100 frames are to be reproduced between a time point indicated by the angle of view entry 2120 and a time point indicated by the angle of view entry 2130. This insertion of an adjustment entry may smooth reproduction of 360-degree content.

According to an example embodiment, a user may directly input an adjustment entry as described with reference to FIG. 20 into a text file that constitutes angle of view information.

Figure 22:
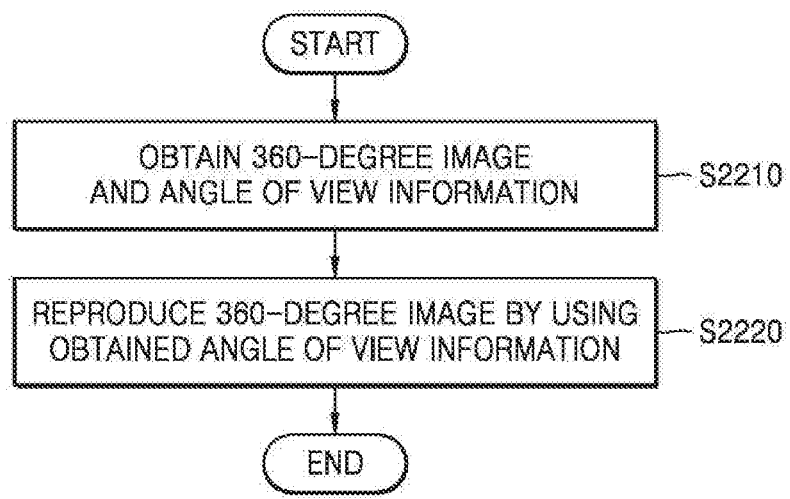
FIG. 22 is a flowchart of a method of reproducing 360-degree content by using created angle of view information, according to an example embodiment.

FIG. 22 is a flowchart of a method of reproducing 360-degree content by using created angle of view information, according to an example embodiment.

Referring to FIG. 22, in operation S2210, an image display apparatus may obtain a 360-degree image and angle of view information.

According to example embodiments, the image display apparatus may obtain the angle of view information from a file storing the 360-degree image or from a file independent from the file storing the 360-degree image.

According to example embodiments, the image display apparatus may obtain the angle of view information from memory included in the image display apparatus or from a server that provides angle of view information.

The angle of view information may be angle of view information initially created for the 360-degree image or angle of view information initially created for another 360-degree image.

According to example embodiments, the 360-degree image may be constructed with a single file or a plurality of files.

In operation S2220, the image display apparatus may reproduce the 360-degree image by using the obtained angle of view information.

The image display apparatus may determine an angle of view or a zoom degree during reproduction of the 360-degree image by referring to time information, an angle of view value, and a zoom value included in an angle of view entry included in the angle of view information. In detail, the image display apparatus may change an angle of view value to the angle of view value included in the angle of view entry and display an image of a region corresponding to the changed angle of view, at a time point indicated by the angle of view entry. The image display apparatus may adjust a zoom size to the zoom value included in the angle of view entry, enlarge or shrink an image according to the adjusted zoom size, and display an enlarged or shrunk image.

According to example embodiments, when the image display apparatus receives a user input of controlling an angle of view during reproduction of the 360-degree image by referring to the angle of view information, the image display apparatus may operate according to various scenarios.

According to an example embodiment, when the image display apparatus receives a user input of controlling an angle of view during reproduction of the 360-degree image by referring to the angle of view information, the image display apparatus may ignore the angle of view information and reproduce an image in correspondence with the angle of view according to the user input of controlling an angle of view.

According to an example embodiment, when the image display apparatus has received a user input of controlling an angle of view during reproduction of the 360-degree image by referring to the angle of view information, the image display apparatus may reproduce an image in correspondence with an angle of view according to the user input of controlling an angle of view, and may reproduce a 360-degree image by again referring to the angle of view information after a period of time (e.g., 30 seconds) has lapsed. In other words, when the image display apparatus receives a user input of controlling an angle of view during reproduction of the 360-degree image by referring to the angle of view information, the image display apparatus may reproduce an image by adjusting an angle of view according to the user input during a period of time after the user input has been received, and may reproduce a 360-degree image by back again referring to the angle of view information after a period of time has lapsed.

Figure 23:
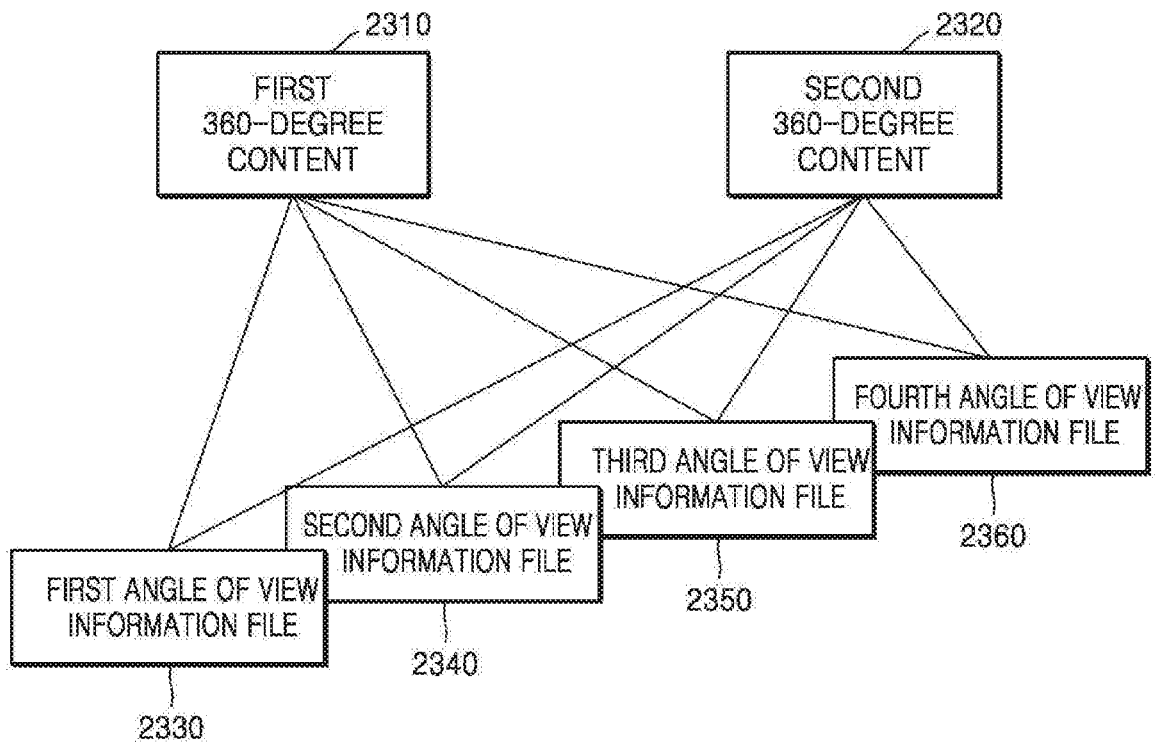
FIG. 23 is a reference diagram illustrating versatility of applications when angle of view information is constructed as a file separate from 360-degree content, according to an example embodiment.

FIG. 23 is a reference diagram illustrating versatility of applications when angle of view information is constructed as a file separate from 360-degree content, according to an example embodiment.

Referring to FIG. 23, there may be first 360-degree content 2310, second 360-degree content 2320, a first angle of view information file 2330, a second angle of view information file 2340, a third angle of view information file 2350, and a fourth angle of view information file 2360.

The first through fourth angle of view information files 2330 through 2360 may be used in reproducing the first 360-degree content 2310. Similarly, the first through fourth angle of view information files 2330 through 2360 may also be used in reproducing the second 360-degree content 2320.

A situation in which an angle of view information file is usable in a plurality of items of content as shown in FIG. 23 may be used in a 360-degree music video of a music group including a plurality of singers. For example, in the case of a music group including a plurality of singers, a position of a specific singer is generally designated. Accordingly, when an angle of view information file is generated for a singer A positioned at the center of a first music video of the singer group, the singer A is highly likely to be also positioned at the center of a second music video of the singer group and a motion line of the singer A in the second music video is highly likely to be similar to that in the first music video. In this case, an angle of view information file created for the first music video may be used together with the second music video.

Figure 24:
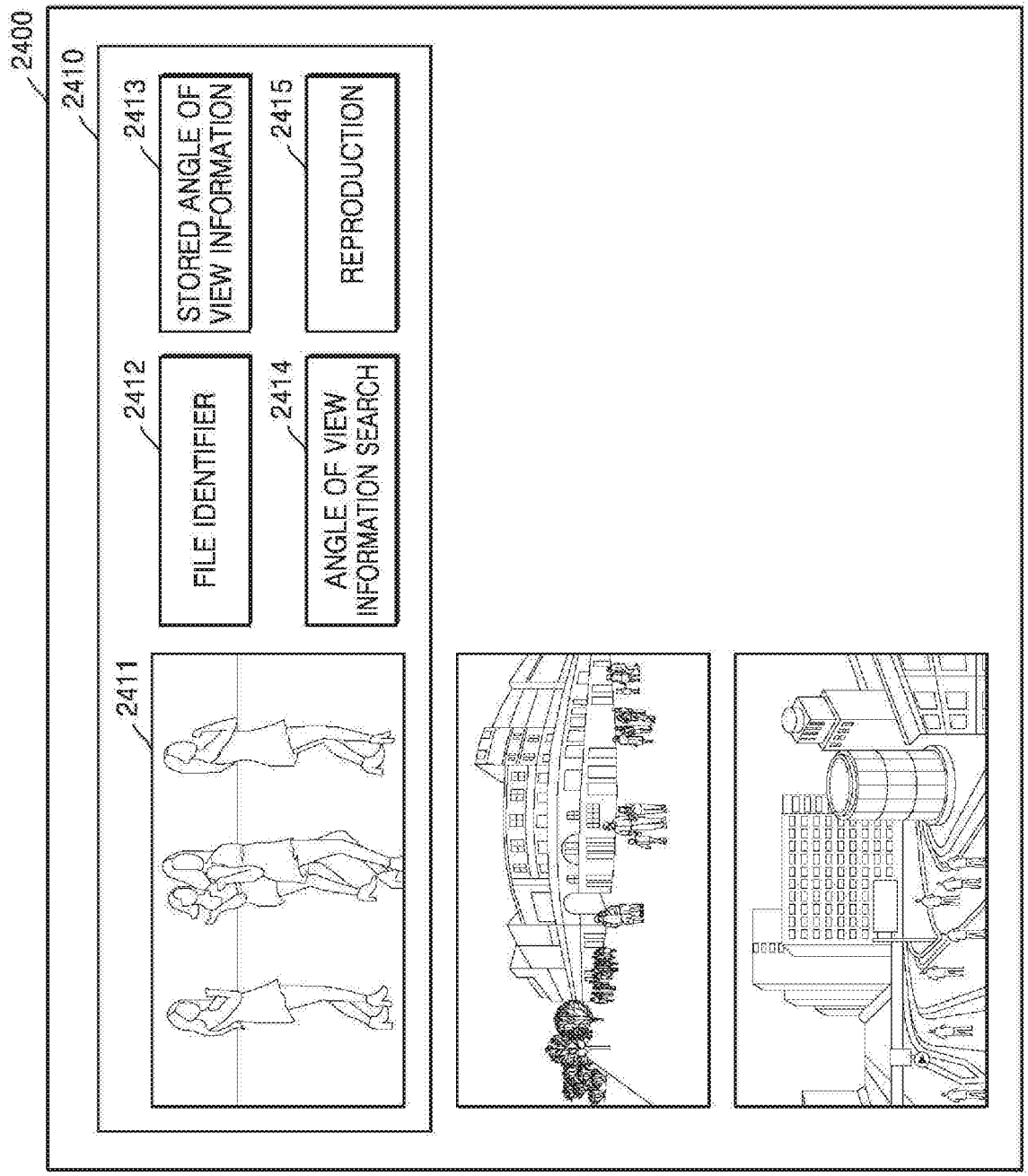
FIG. 24 is a user interface via which an image display apparatus displays angle of view information of 360-degree content, according to an example embodiment.

FIG. 24 is a user interface via which an image display apparatus displays angle of view information of 360-degree content, according to an example embodiment.

Referring to FIG. 24, a user interface 2400 may display information about a plurality of items of 360-degree content. Information 2410 about one of the plurality of items of 360-degree content may include a thumbnail image 2411 of the one 360-degree content, a file identifier 2412 of the one 360-degree content, an angle of view information button 2413 of angle of view information stored in correspondence with the one 360-degree content, an angle of view information search button 2414, and a reproduction button 2415.

According to a selection of the angle of view information button 2413, the image display apparatus may display files stored in a local storage of the image display apparatus as at least one angle of view information file created for the one 360-degree content.

According to a selection of the angle of view information search button 2414, the image display apparatus may transmit, to a server via a network, a request to search for an angle of view information file created for the 360-degree content, may receive an angle of view information file list in response to the request, and may display the received angle of view information file list.

Figure 25:
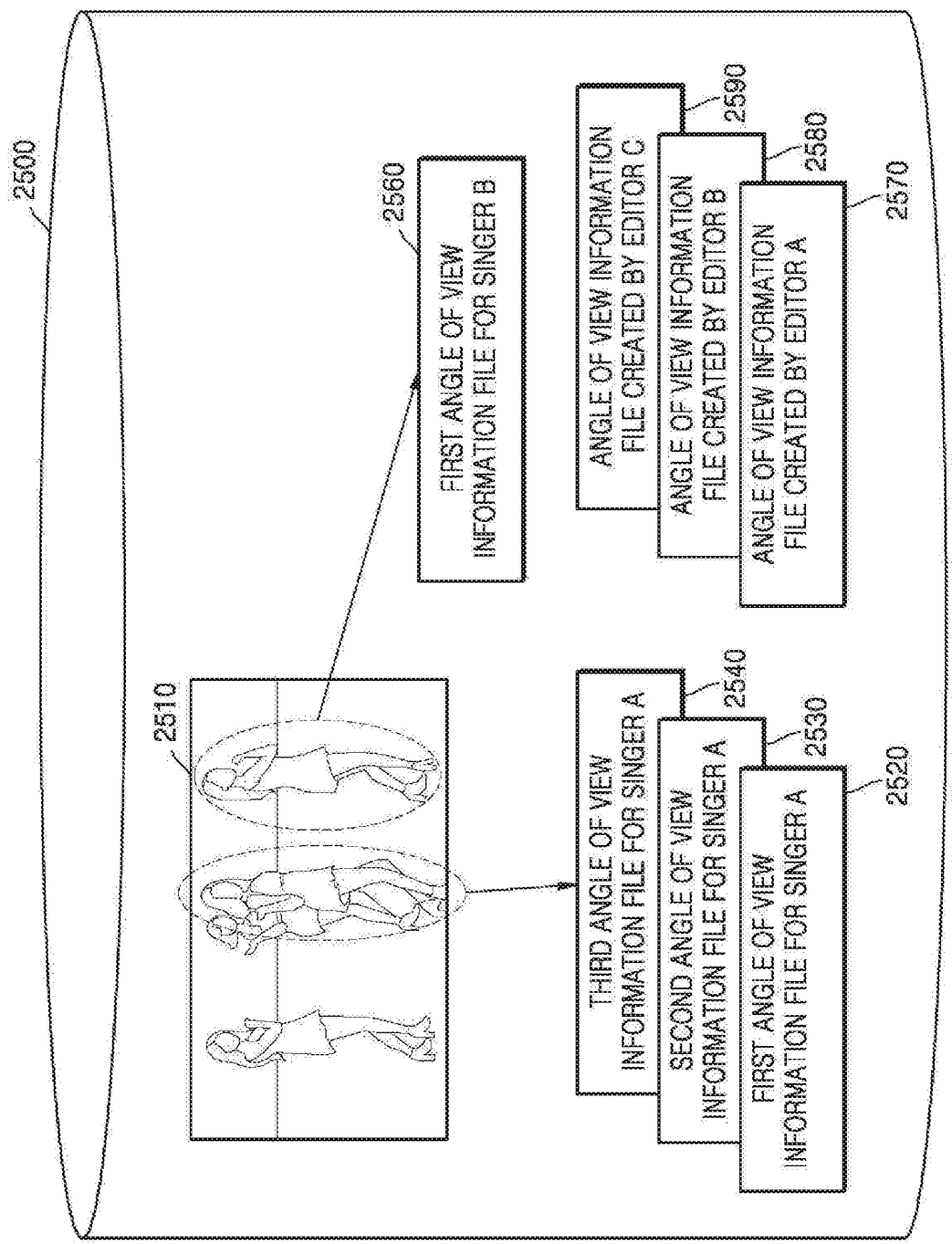
FIG. 25 is a reference diagram illustrating various types of angle of view information files that may be created and maintained for one item of 360-degree content, according to an example embodiment.

FIG. 25 is a reference diagram 2500 illustrating various types of angle of view information files that may be created and maintained for one item of 360-degree content, according to an example embodiment.

Referring to FIG. 25, an angle of view information file created by at least one editor may exist for a single 360-degree content file 2510. For example, in FIG. 25, angle of view information files 2570, 2580, and 2590 respectively created by an editor A, an editor B, and an editor C are stored.

When the 360-degree content file 2510 includes a plurality of objects, at least one angle of view information file may be created for each object. Referring to FIG. 25, three angle of view information files 2520, 2530, and 2540 are created for a singer A appearing in the 360-degree content file 2510. A first angle of view information file 2560 is stored in correspondence with a singer B. As such, because a plurality of angle of view information files may be created for even a single 360-degree content file, a user may have a wide range of angle of view information files that may be selected during reproduction of the 360-degree content file.

A database for storing angle of view information files as shown in FIG. 25 may be stored in a server that provides 360-degree content. Such a database may exist within a terminal.

Figure 26:
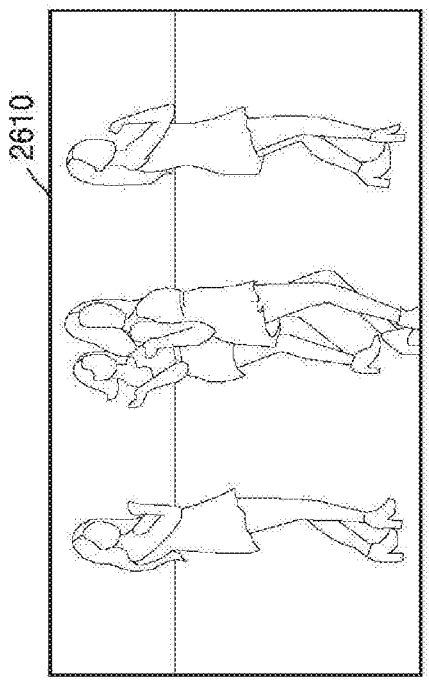
FIG. 26 is a user interface which a server that provides 360-degree content may provide to select angle of view information, according to an example embodiment.

FIG. 26 is a user interface which a server that provides 360-degree content may provide to select angle of view information, according to an example embodiment.

For example, when the angle of view information search button 2414 of FIG. 24 is selected, the image display apparatus may be connected to the server and may display a user interface 2600 of FIG. 26.

Referring to FIG. 26, the user interface 2600 may display a thumbnail image or preview image 2610 of 360-degree content. The user interface 2600 may display, on a lower portion, angle of view information according to various categories in which angle of view information usable in reproducing the 360-degree content may be selected.

The user interface 2600 may display a menu 2620 for selection according to objects. For example, selectable objects may include a singer A, a singer B, and a singer C.

The user interface 2600 may display a menu 2630 for selection according to the number of hits. The server may rank a plurality of angle of view information files according to the number of hits or downloads of an angle of view information file, and may provide the user with information about the ranking of the angle of view information files, whereby the user may select a more popular angle of view information file.

The user interface 2600 may display a menu 2640 for selection according to editors. For example, selectable editors may include an editor A, an editor B, and an editor C.

According to a usage demand for 360-degree content, a professional that professionally edits 360-degree content may appear. Alternatively, a 360-degree content creator may create an angle of view information file usable together with 360-degree content that the 360-degree content creator created. Thus, users may want an angle of view information file that a specific editor or a specific producer created, and thus provision of the menu 2640 may be conveniently used.

Figure 27:
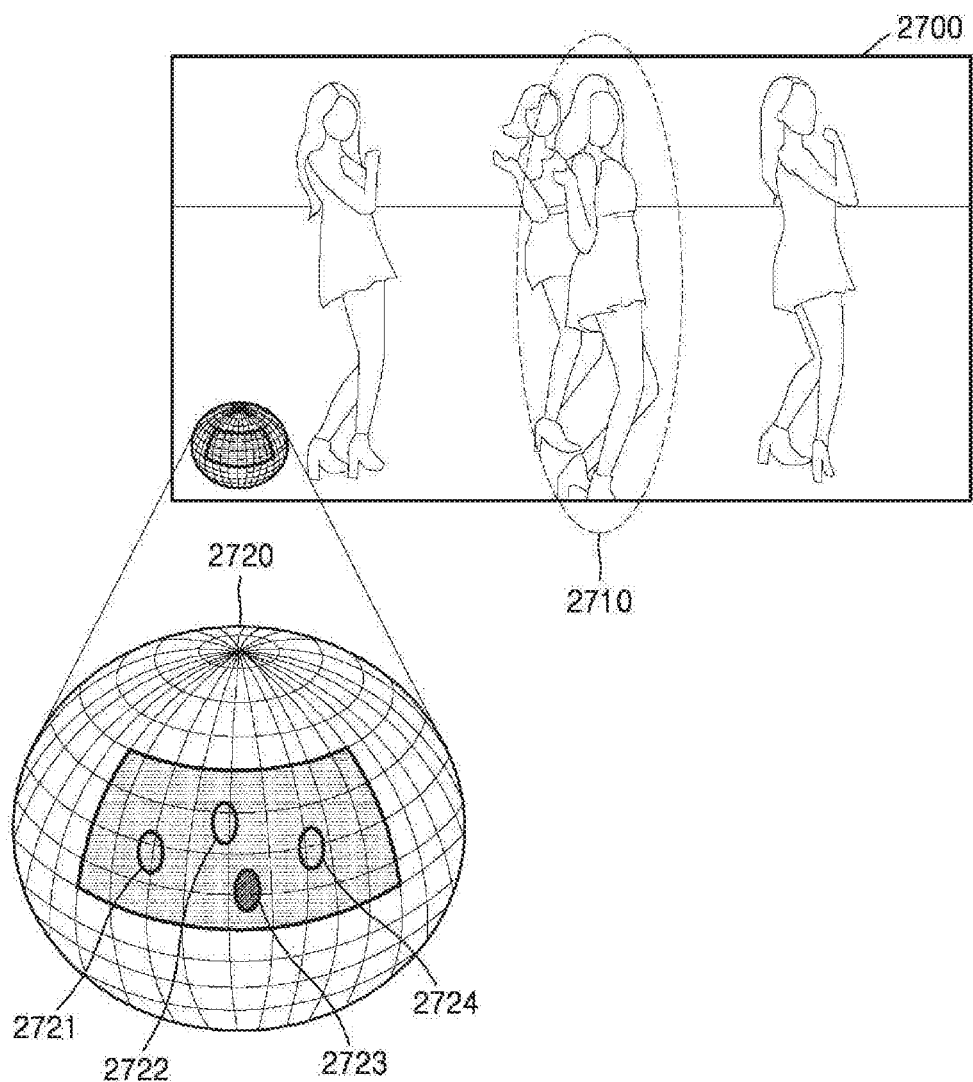
FIG. 27 is a reference diagram illustrating a method of displaying a location of an object on a screen image when 360-degree content includes a plurality of objects and angle of view information is created by tracking one of the plurality of objects, according to an example embodiment.

FIG. 27 is a reference diagram illustrating a method of displaying a location of an object on a screen image when 360-degree content includes a plurality of objects and angle of view information is created by tracking one of the plurality of objects, according to an example embodiment.

Referring to FIG. 27, an image display apparatus may display an image 2700 corresponding to a region of a 360-degree image, and a 3D indicator 2720 indicating a location of the region. The 3D indicator 2720 may be a spherical indicator or a cylindrical indicator, but example embodiments are not limited thereto. The 3D indicator 2720 may display the region to indicate the location of the region. The 3D indicator 2720 in a spherical shape may be referred to as a ball map.

According to an example embodiment, the image display apparatus may reproduce the 360-degree image by using angle of view information created by tracking one of the plurality of objects included in the 360-degree image. At this time, the image display apparatus may indicate, via the 3D indicator 2720, that a currently-being-reproduced image is information for tracking a specific object.

Referring to FIG. 27, the image display apparatus may display a plurality of objects appearing on a currently-being-displayed 360-degree image, as a preset symbol, character, polygon, or the like, on the 3D indicator 2720. The symbol, character, polygon, or the like representing the objects on the 3D indicator 2720 may move or may be moved according to movements or transfers of the objects on the 360-degree image. For example, in FIG. 27, objects representing singers are represented as circles on the 3D indicator 2720. In addition, to indicate that the currently-being-reproduced 360-degree image is displayed according to angle of view information created by tracking a specific object, the image display apparatus may differently display a circle corresponding to the specific object from among a plurality of circles displayed on the 3D indicator 2720. For example, referring to FIG. 27, the image display apparatus may display a plurality of untracked objects as empty circles 2721, 2722, and 2724 and a currently—tracked object 2710 as a filled circle 2723, on the 3D indicator 2720.

An object used for angle of view information tracking from among a plurality of objects may be displayed to be distinguished from the other objects by using any of various methods. For example, a target object may be distinguished from the other objects, for example, by being expressed in a different color or a different shape, by pointing to a polygon corresponding to the target object with an arrow, or by making only the polygon corresponding to the target object flicker.

Example embodiments in which angle of view information is created for 360-degree content including a plurality of files will now be described with reference to FIGS. 28-32.

Figure 28:
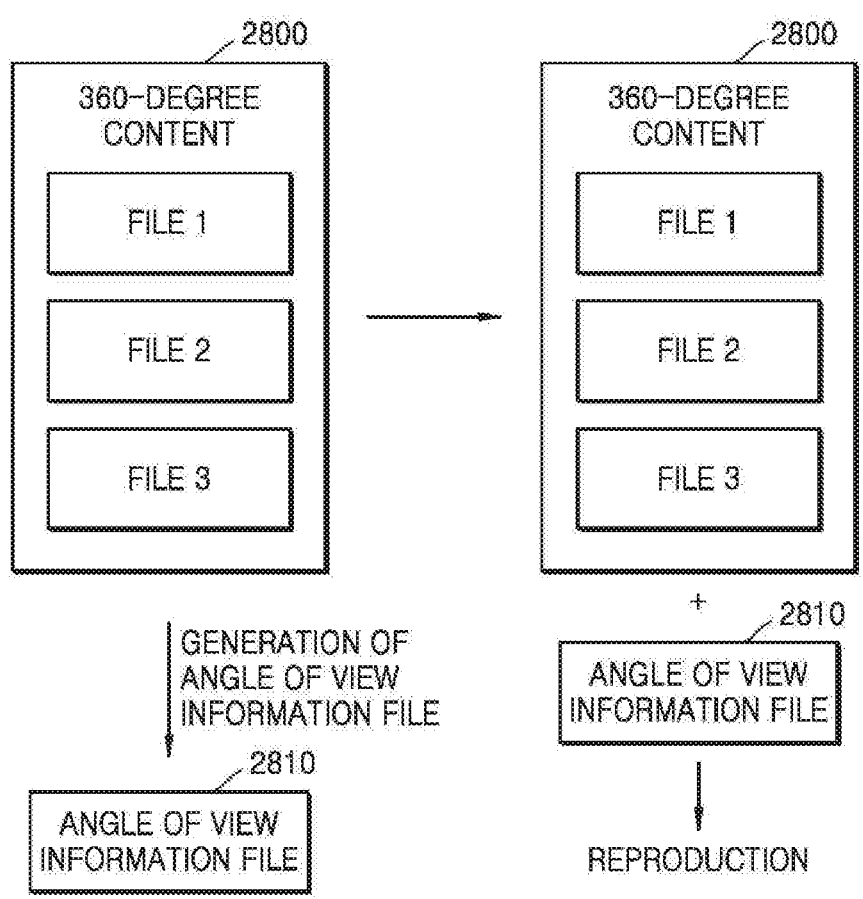
FIG. 28 is a reference diagram for schematically explaining a scenario for managing angle of view information for 360-degree content including a plurality of files, according to an example embodiment.

FIG. 28 is a reference diagram for schematically explaining a scenario for managing angle of view information for 360-degree content including a plurality of files.

Referring to FIG. 28, an image display apparatus may generate a single angle of view information file 2810 for 360-degree content 2800 including files 1, 2, and 3. The angle of view information file 2810 may include angle of view information for all of the files 1, 2, and 3.

Thereafter, the image display apparatus may reproduce the 360-degree content 2800 including the files 1, 2, and 3 by referring to the angle of view information file 2810. Because the angle of view information file 2810 includes the angle of view information for the files 1, 2, and 3, the image display apparatus may alternately reproduce the files 1, 2, and 3 when referring to the angle of view information file 2810.

Figure 29:
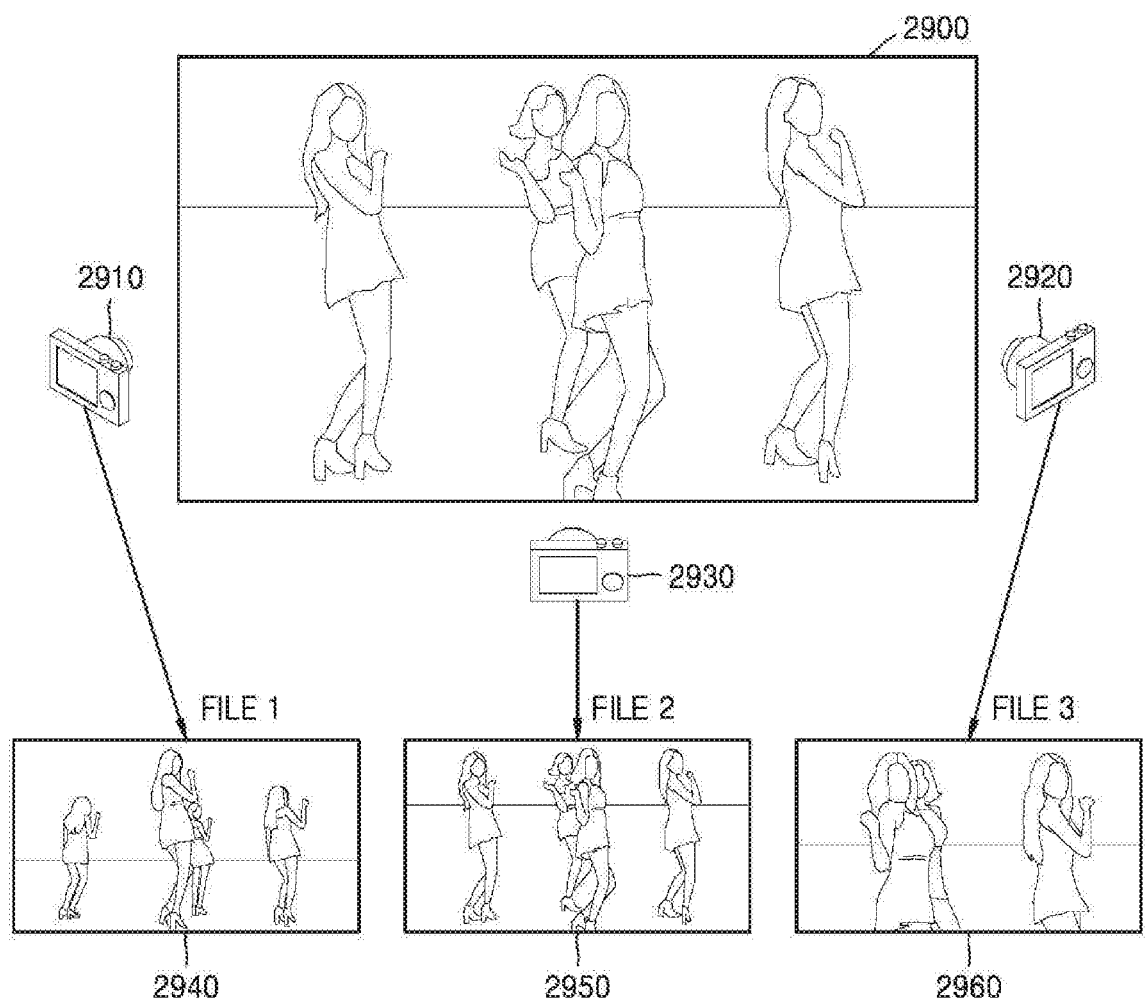
FIG. 29 is a reference diagram illustrating 360-degree content including a plurality of files, according to an example embodiment.

FIG. 29 is a reference diagram illustrating 360-degree content including a plurality of files, according to an example embodiment.

For example, when a plurality of 360-degree cameras are used to photograph a single scene, such as, when a sports game scene is photographed using a plurality of 360-degree cameras or when a concert or music video is shot using a plurality of 360-degree cameras, 360-degree content including a plurality of files may be created.

Referring to FIG. 29, a scene 2900 is photographed using three cameras, namely, cameras 2910, 2920, and 2930, for music video shooting or concert recording. An image captured using the camera 2910 on the left side of the stage indicates a first file 2940, an image captured using the camera 2930 in front of the stage indicates a second file 2950, and an image captured using the camera 2920 on the right side of the stage indicates a third file 2960.

Figure 30:
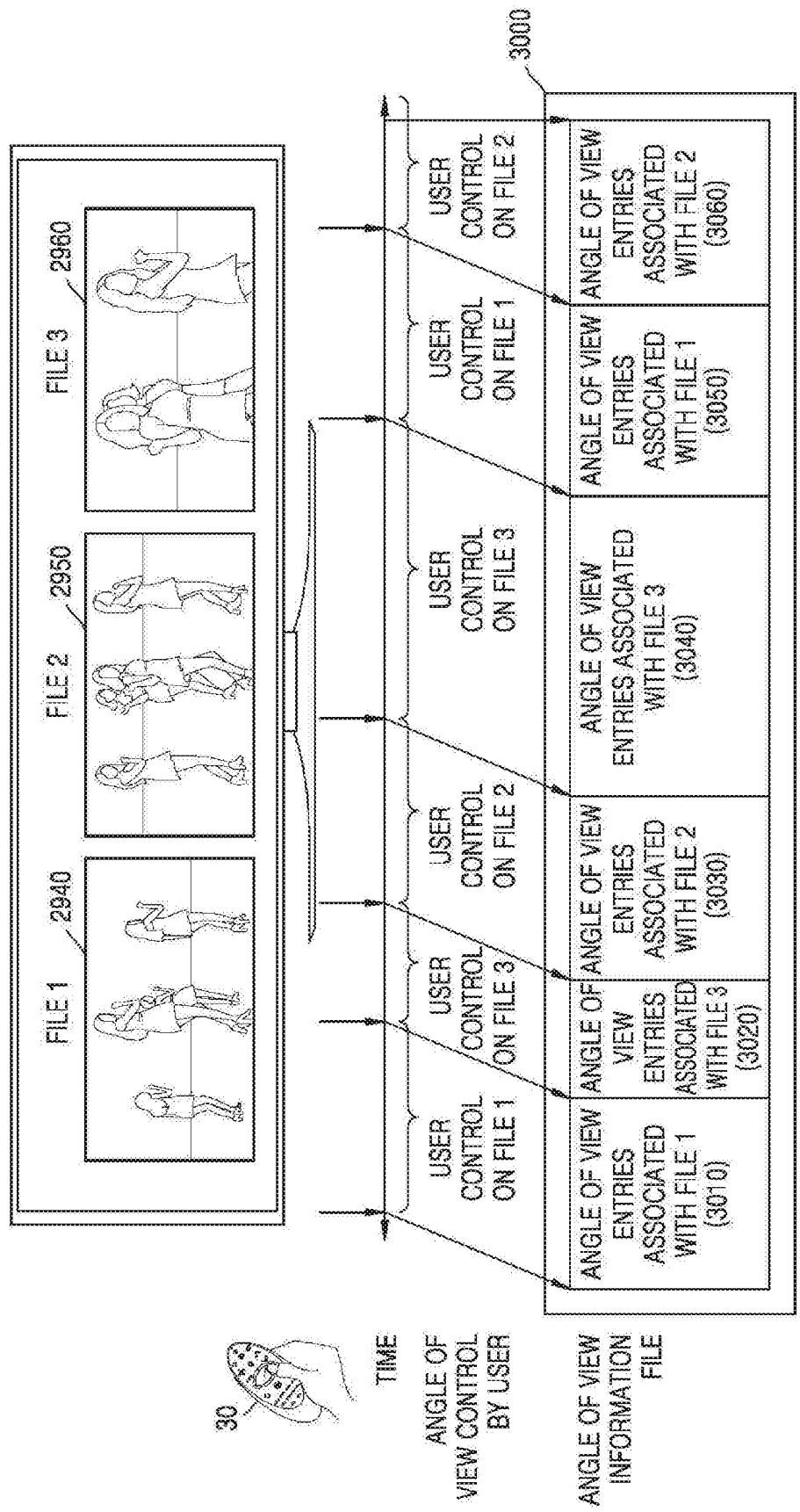
FIG. 30 is a reference diagram illustrating a method of creating angle of view information by using first, second, and third files of FIG. 29, according to an example embodiment.

FIG. 30 is a reference diagram illustrating a method of creating angle of view information by using the first, second, and third files 2940, 2950, and 2960 of FIG. 29, according to an example embodiment.

Referring to FIG. 30, an image display apparatus may simultaneously reproduce the first, second, and third files 2940, 2950, and 2960 constituting the 360-degree content. The first, second, and third files 2940, 2950, and 2960 may be displayed by being overlapped with each other on a single screen image, or may be displayed on a plurality of sub screen images. While the first, second, and third files 2940, 2950, and 2960 are being reproduced, a user may perform angle of view control on the first, second, and third files 2940, 2950, and 2960.

When angle of view control on the first file 2940 occurs after the first, second, and third files 2940, 2950, and 2960 start being reproduced, the image display apparatus may generate angle of view entries 3010 associated with the first file 2940. Next, when angle of view control on the third file 2960 occurs, the image display apparatus may generate angle of view entries 3020 associated with the third file 2960. When angle of view control on the second file 2950 occurs, the image display apparatus may generate angle of view entries 3030 associated with the second file 2950. When angle of view control on the third file 2960 occurs, the image display apparatus may generate angle of view entries 3040 associated with the third file 2960. When angle of view control on the second file 2950 occurs, the image display apparatus may generate angle of view entries 3060 associated with the second file 2950. As such, when the user performs angle of view control on not only a single file but also performs angle of view controls on several files, the image display apparatus may collect angle of view entries associated with files subjected to angle of view control to generate an angle of view information file 3000.

Figure 31:
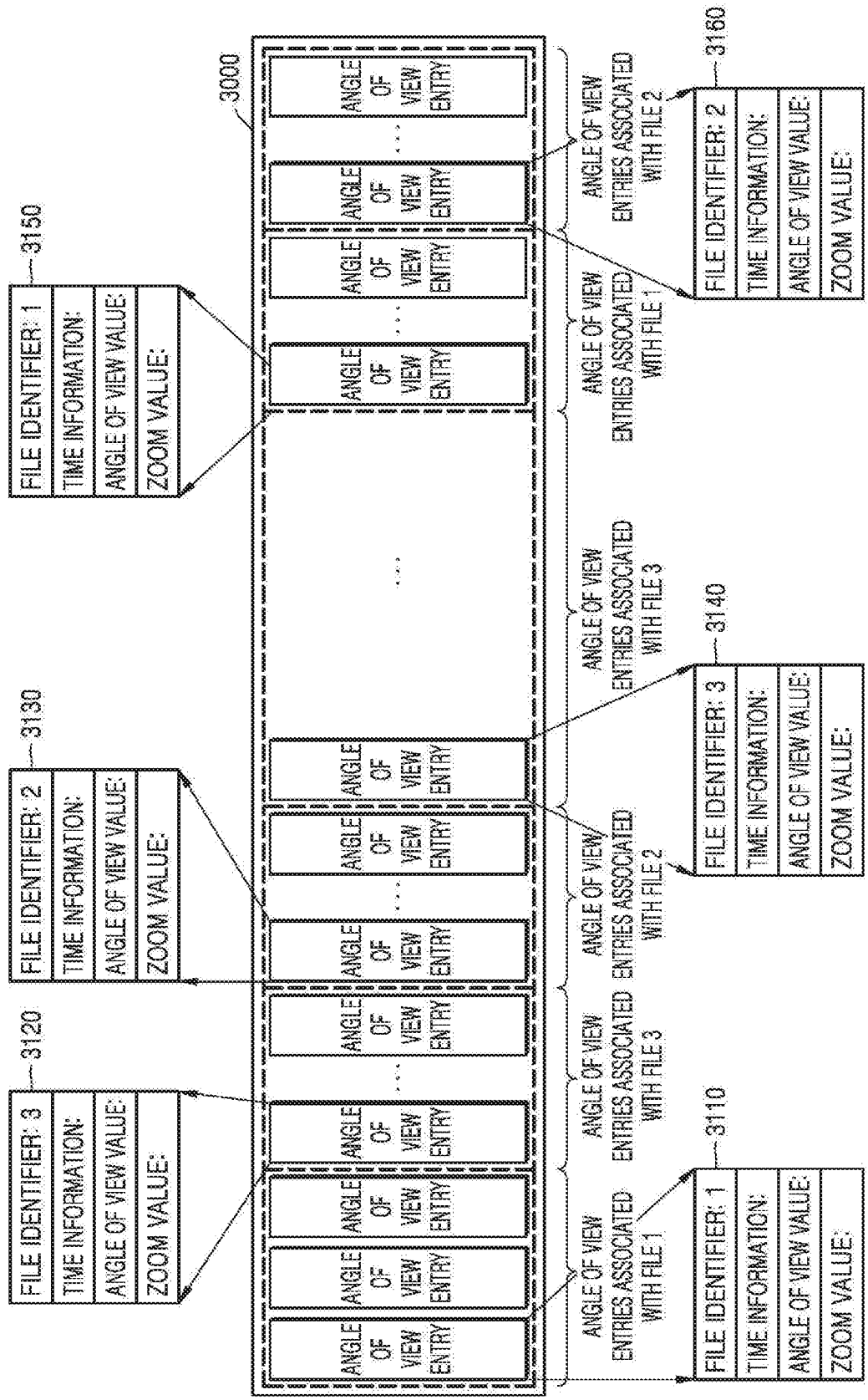
FIG. 31 is a schematic diagram for illustrating an example of a structure of an angle of view information file created according to the operation of FIG. 30, according to an example embodiment.

FIG. 31 is a schematic diagram for illustrating an example of a structure of an angle of view information file created according to the operation of FIG. 30.

Referring to FIG. 31, because angle of view entries are created for a plurality of files, angle of view information 3000 needs to indicate to which file each angle of view entry corresponds. Thus, each angle of view entry of the angle of view information 3000 may further include a file identifier. For example, each angle of view entry 3110 associated with a file 1 may include time information, an angle of view value, and a zoom value together with information indicating that a file identifier is 1. Each angle of view entry 3120 associated with a file 3 may include time information, an angle of view value, and a zoom value together with information indicating that a file identifier is 3. Each angle of view entry 3130 associated with a file 2 may include time information, an angle of view value, and a zoom value together with information indicating that a file identifier is 2. Each angle of view entry 3140 associated with a file 3 may include time information, an angle of view value, and a zoom value together with information indicating that a file identifier is 3. Each angle of view entry 3150 associated with a file 1 may include time information, an angle of view value, and a zoom value together with information indicating that a file identifier is 1. Each angle of view entry 3160 associated with a file 2 may include time information, an angle of view value, and a zoom value together with information indicating that a file identifier is 2.

Figure 32:
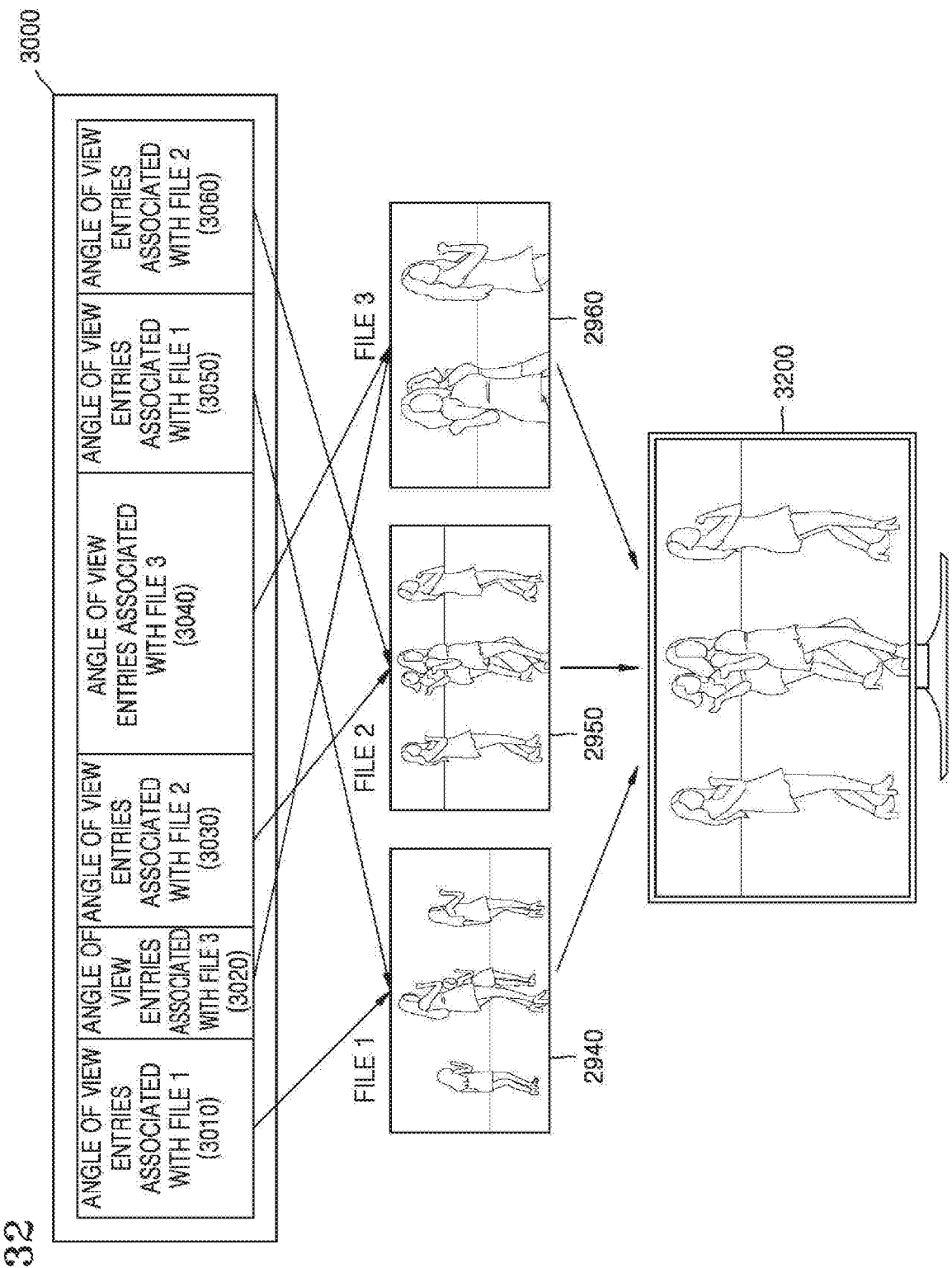
FIG. 32 is a reference diagram illustrating a method of reproducing 360-degree content by using angle of view information as shown in FIG. 31, according to an example embodiment.

FIG. 32 is a reference diagram illustrating a method of reproducing 360-degree content by using angle of view information as shown in FIG. 31.

Referring to FIG. 32, an image display apparatus may refer to the angle of view information 3000 when reproducing the 360-degree content by using the first, second, and third files 2940, 2950, and 2960.

For example, the image display apparatus may read out the stored angle of view information 3000 and reproduce the 360-degree content according to the angle of view entries included in the angle of view information 3000.

In detail, the image display apparatus may reproduce the 360-degree content while scanning the angle of view information 3000 starting from foremost angle of view entries. Because the angle of view entries 3010 associated with the first file 2940 exist at the beginning of the angle of view information 3000, the image display apparatus may display an image of a region corresponding to an angle of view value included in each of the angle of view entries 3010, on an image of the first file 2940. Because the angle of view entries 3020 associated with the third file 2960 exist next to the beginning of the angle of view information 3000, the image display apparatus may display an image of a region corresponding to an angle of view value included in each of the angle of view entries 3020, on an image of the third file 2960. The image display apparatus may display an image of a region corresponding to an angle of view value included in each of the angle of view entries 3030 on an image of the second file 2950. The image display apparatus may display an image of a region corresponding to an angle of view value included in each of the angle of view entries 3040 on an image of the third file 2960. The image display apparatus may display an image of a region corresponding to an angle of view value included in each of the angle of view entries 3050 on an image of the first file 2940. The image display apparatus may display an image of a region corresponding to an angle of view value included in each of the angle of view entries 3060 on an image of the second file 2950. In this way, the image display apparatus may refer to the contents, namely, a file identifier, time information, an angle of view value, and a zoom value, of each angle of view entry included in angle of view information and thus may display an image of a region corresponding to the angle of view value at a time indicated by the time information on an image of a file corresponding to the file identifier, thereby reproducing 360-degree content including a plurality of files.

According to example embodiments, a user stores angle of view information associated with angle of view control while viewing a 360-degree image and thus reads out and utilizes the stored angle of view information without needing to control an angle of view again during reproduction of a next 360-degree image, thereby conveniently watching 360-degree images.

Moreover, according to example embodiments, the angle of view information is created and managed as a separate file from a 360-degree image, leading to an increase in utilization of 360-degree images.

A method of operating an image display apparatus according to an example embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for example embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

While one or more example embodiments have been described with reference to the figures, it will be understood by those of ordinary skill in the art that various changes in form and details may be made therein without departing from the spirit and scope as defined by the following claims.

What is claimed is:

1. An image reproducing apparatus comprising:
a memory configured to store instructions; and
a processor configured to execute the instructions to:
store one or more angle of view information files corresponding to one or more objects included in a 360-degree content, each angle of view information file containing a plurality of entries, each entry of the plurality of entries comprising a time point and an angle of view value indicating a region of the 360-degree content to be displayed at the time point;
obtain the 360-degree content;
display a graphic user interface including a first display element and a second display element displayed simultaneously on a same screen, both of the first display element and the second display element corresponding to the 360-degree content, the first display element comprising an object identifier corresponding to an object included in the 360-degree content, the second display element comprising a ranking identifier corresponding to a number of hits of an angle of view information file of the one or more angle of view information files, each angle of view information file corresponding to a respective ranking identifier from among the one or more ranking identifiers respectively created to reproduce the 360-degree content using particular angle of view values;
receive a user input through the graphic user interface;
in response to the user input comprising a first user input to select the first display element, obtain a first angle of view information file corresponding to the selected first display element and reproduce the 360-degree content according to the obtained first angle of view information file; and
in response to the user input comprising a second user input to select the second display element, obtain a second angle of view information file corresponding to the selected second display element and reproduce the 360-degree content according to the obtained second angle of view information file,
wherein the first angle of view information file corresponding to the selected first display element is for tracking the identified object in one or more scenes in which the identified object occurs, using the time point and the angle of view value.

2. The image reproducing apparatus of claim 1, wherein each entry of the plurality of entries further comprises zoom size information.

3. The image reproducing apparatus of claim 1, further comprising a communication interface,
wherein the processor is further configured to:
in response to the user input comprising the first user input, execute the instructions to control the communication interface to receive the first angle of view information file of the 360-degree content from an external computer; and
in response to the user input comprising the second user input, execute the instructions to control the communication interface to receive the second angle of view information file of the 360-degree content from the external computer.

4. The image reproducing apparatus of claim 1, wherein the graphic user interface further comprises information on one or more angle of view information files recommended according to a preset criterion from among a plurality of pieces of angle of view information corresponding to the 360-degree content.

5. The image reproducing apparatus of claim 1, wherein the processor is further configured to:
in response to receiving the first user input, execute the instructions to extract the first angle of view information file from the 360-degree content or obtain the first angle of view information file from a meta file separate from the 360-degree content; and
in response to receiving the second user input, execute the instructions to extract the second angle of view information file from the 360-degree content or obtain the second angle of view information file from the meta file separate from the 360-degree content.

6. A method of operating an image reproducing apparatus, the method comprising:
storing one or more angle of view information files corresponding to one or more objects included in a 360-degree content, each angle of view information file containing a plurality of entries, each entry of the plurality of entries comprising a time point and an angle of view value indicating a region of the 360-degree content to be displayed at the time point;
obtaining the 360-degree content;
displaying a graphic user interface including a first display element and a second display element displayed simultaneously on a same screen, both of the first display element and the second display element corresponding to the 360-degree content, the first display element comprising an object identifier corresponding to an object included in the 360-degree content, the second display element comprising a ranking identifier corresponding to a number of hits of an angle of view information file of the one or more angle of view information files, each angle of view information file corresponding to a respective ranking identifier from among the one or more ranking identifiers respectively created to reproduce the 360-degree content using particular angle of view values;

receiving a user input through the graphic user interface;

in response to the user input comprising a first user input to select the first display element, obtaining a first angle of view information file corresponding to the selected first display element and reproducing the 360-degree content according to the obtained first angle of view information file;

in response to the user input comprising a second user input to select the second display element, obtaining a second angle of view information file corresponding to the selected second display element and reproducing the 360-degree content according to the obtained second angle of view information file; and reproducing the 360-degree content according to the obtained angle of view information file, wherein the first angle of view information file corresponding to the selected first display element is for tracking the identified object in one or more scenes in which the identified object occurs, using the time point and the angle of view value.

7. The method of claim 6, wherein each entry of the plurality of entries further comprises zoom size information.

8. The method of claim 6, further comprising:
in response to the user input comprising the first user input, receiving the first angle of view information file of the 360-degree content from an external computer; and
in response to the user input comprising the second user input, receiving the second angle of view information file of the 360-degree content from the external computer.

9. The method of claim 6, wherein the graphic user interface further comprises information on one or more angle of view information files recommended according to a preset criterion from among a plurality of pieces of angle of view information corresponding to the 360-degree content.

10. The method of claim 6, further comprising:
in response to receiving the first user input, extracting the first angle of view information file from the 360-degree content or obtaining the first angle of view information file from a meta file separate from the 360-degree content; and
in response to receiving the second user input, extracting the second angle of view information file from the 360-degree content or obtaining the second angle of view information file from the meta file separate from the 360-degree content.

11. A computer program product comprising one or more non-transitory computer-readable storage media having recorded thereon a computer program, which, when executed by a computer, performs the method of claim 6.

* * * * *